US009183752B2

(12) United States Patent
Nickell et al.

(10) Patent No.: US 9,183,752 B2
(45) Date of Patent: Nov. 10, 2015

(54) TUTORIAL GENERATOR WITH AUTOMATIC CAPTURE OF SCREENSHOTS

(75) Inventors: Seth Nickell, Cambridge, MA (US); Diana Fong, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 1605 days.

(21) Appl. No.: 11/160,901

(22) Filed: Jul. 14, 2005

(65) Prior Publication Data

US 2007/0015118 A1  Jan. 18, 2007

(51) Int. Cl.
*G09B 19/00* (2006.01)
*G09B 5/02* (2006.01)
*G09B 7/02* (2006.01)

(52) U.S. Cl.
CPC ... *G09B 5/02* (2013.01); *G09B 7/02* (2013.01)

(58) Field of Classification Search
CPC ....... G09B 19/0053; G09B 5/02; G09B 19/00
USPC ....... 434/307 R, 118, 350, 353; 715/705, 709
See application file for complete search history.

(56) References Cited

U.S. PATENT DOCUMENTS

| | | | | |
|---|---|---|---|---|
| 4,689,022 A | * | 8/1987 | Peers et al. | 434/307 R |
| 4,941,829 A | * | 7/1990 | Estes et al. | 434/118 |
| 5,103,498 A | * | 4/1992 | Lanier et al. | 706/58 |
| 5,109,482 A | * | 4/1992 | Bohrman | 715/723 |
| 5,179,654 A | * | 1/1993 | Richards et al. | 715/708 |
| 5,230,628 A | * | 7/1993 | Kaneko et al. | 434/118 |
| 5,239,617 A | * | 8/1993 | Gardner et al. | 706/11 |
| 5,388,251 A | * | 2/1995 | Makino et al. | 714/57 |
| 5,388,993 A | | 2/1995 | McKiel et al. | |
| 5,395,242 A | * | 3/1995 | Slye et al. | 463/1 |
| 5,395,243 A | * | 3/1995 | Lubin et al. | 434/118 |
| 5,432,940 A | * | 7/1995 | Potts et al. | 719/320 |
| 5,442,759 A | * | 8/1995 | Chiang et al. | 705/1 |
| 5,481,667 A | * | 1/1996 | Bieniek et al. | 715/709 |
| 5,493,658 A | * | 2/1996 | Chiang et al. | 715/709 |
| 5,513,308 A | * | 4/1996 | Mori | 715/707 |
| 5,524,193 A | * | 6/1996 | Covington et al. | 715/210 |
| 5,535,323 A | * | 7/1996 | Miller et al. | 715/707 |
| 5,535,422 A | * | 7/1996 | Chiang et al. | 715/709 |
| 5,577,186 A | * | 11/1996 | Mann et al. | 715/203 |
| 5,602,982 A | * | 2/1997 | Judd et al. | 715/709 |
| 5,745,738 A | * | 4/1998 | Ricard | 703/13 |
| 5,816,820 A | * | 10/1998 | Heinz et al. | 434/118 |
| 6,020,886 A | | 2/2000 | Jacober et al. | |
| 6,021,403 A | * | 2/2000 | Horvitz et al. | 706/45 |
| 6,061,758 A | * | 5/2000 | Reber et al. | 711/100 |

(Continued)

*Primary Examiner* — Sam Yao
*Assistant Examiner* — Alvin Carlos
(74) *Attorney, Agent, or Firm* — Lowenstein Sandler LLP

(57) ABSTRACT

Screenshots on a computer display are automatically captured to assist in building a tutorial to demonstrate the functionality of one or more applications. In one possible approach, an event detector, such as an accessibility toolkit, detects when events are generated by the one or more applications. The events may include, e.g., button clicks, windows opening or closing, drag and drop events, check boxes being checked, menus being pulled down or menu items selected, and so forth. Or, a program may monitor pixel changes on the screen to detect when changes occur in the images generated by the one or more applications. A tutorial builder application automatically captures an image when the event or image change is detected, edits the captured image such as by providing a focus on the changed portion, and provides the edited image in a tutorial window. Related text can also be automatically generated.

30 Claims, 35 Drawing Sheets

(56) References Cited

U.S. PATENT DOCUMENTS

| | | | | |
|---|---|---|---|---|
| 6,067,538 A | * | 5/2000 | Zorba et al. | 706/47 |
| 6,099,317 A | * | 8/2000 | Bullwinkel et al. | 434/118 |
| 6,170,065 B1 | * | 1/2001 | Kobata et al. | 714/7 |
| 6,219,047 B1 | * | 4/2001 | Bell | 715/705 |
| 6,233,570 B1 | * | 5/2001 | Horvitz et al. | 706/11 |
| RE37,431 E | * | 10/2001 | Lanier et al. | 706/58 |
| 6,384,843 B1 | * | 5/2002 | Harel | 715/762 |
| 6,388,665 B1 | * | 5/2002 | Linnett et al. | 345/473 |
| 6,404,441 B1 | * | 6/2002 | Chailleux | 715/704 |
| 6,453,254 B1 | * | 9/2002 | Bullwinkel et al. | 702/81 |
| 6,514,085 B2 | * | 2/2003 | Slattery et al. | 434/335 |
| 6,532,023 B1 | * | 3/2003 | Schumacher et al. | 715/704 |
| 6,549,216 B1 | * | 4/2003 | Schumacher et al. | 715/704 |
| 6,573,915 B1 | * | 6/2003 | Sivan et al. | 715/781 |
| 6,634,887 B1 | * | 10/2003 | Heffernan et al. | 434/322 |
| 6,692,256 B2 | | 2/2004 | Chan et al. | |
| 6,697,088 B1 | * | 2/2004 | Hollander | 715/744 |
| 6,807,535 B2 | * | 10/2004 | Goodkovsky | 706/3 |
| 6,909,874 B2 | * | 6/2005 | Holtz et al. | 434/362 |
| 6,944,624 B2 | * | 9/2005 | Orton et al. | 707/102 |
| 6,981,040 B1 | * | 12/2005 | Konig et al. | 709/224 |
| 7,033,179 B2 | * | 4/2006 | Harriman | 434/118 |
| 7,047,498 B2 | * | 5/2006 | Lui et al. | 715/762 |
| 7,052,277 B2 | * | 5/2006 | Kellman | 434/118 |
| 7,360,159 B2 | * | 4/2008 | Chailleux | 715/709 |
| 7,620,895 B2 | * | 11/2009 | Adkins et al. | 715/709 |
| 7,882,434 B2 | * | 2/2011 | Slotznick et al. | 715/710 |
| 2001/0039002 A1 | * | 11/2001 | Delehanty | 434/322 |
| 2002/0031756 A1 | * | 3/2002 | Holtz et al. | 434/362 |
| 2002/0098468 A1 | * | 7/2002 | Barrett et al. | 434/322 |
| 2002/0107681 A1 | * | 8/2002 | Goodkovsky | 703/22 |
| 2002/0118220 A1 | * | 8/2002 | Lui et al. | 345/709 |
| 2002/0127531 A1 | * | 9/2002 | Kamens et al. | 434/350 |
| 2002/0168616 A1 | * | 11/2002 | Chan et al. | 434/118 |
| 2003/0152904 A1 | * | 8/2003 | Doty, Jr. | 434/350 |
| 2004/0199901 A1 | | 10/2004 | Chapman | |
| 2005/0196730 A1 | * | 9/2005 | Kellman | 434/118 |
| 2005/0227215 A1 | * | 10/2005 | Bruno et al. | 434/322 |
| 2005/0278629 A1 | * | 12/2005 | Chailleux | 715/704 |

* cited by examiner

400

Image editing menu:

a) Select one:

[ ] Display full screen

[ ] Display only changed objects and related parent objects

[ ] Display only changed objects, but not any parent objects b) Select one:

[ ] Crop out changed regions

[ ] De-emphasize unchanged regions c) Choose:

Yes [ ] No [ ] - replace multi-option windows in tutorial after an option is selected d) Apply edit selections to:

[ ] selected image

[ ] all images in tutorial

[ ] selected and subsequent images

FIG-4

TUTORIAL GENERATOR WITH AUTOMATIC CAPTURE OF SCREENSHOTS

FIELD OF INVENTION

The present invention relates to a technique for automatically capturing screenshots on a computer display to assist in building a tutorial, such as for demonstrating the functionality of one or more applications.

DESCRIPTION OF RELATED ART

Technology users are often confused and, in turn, frustrated by poorly written and illustrated tutorials associated with a product they wish to setup, or a task they would like to complete. Confusion arises from complicated text and screenshots that do not correspond with written directions. Moreover, screenshots included in tutorials are usually not inclusive of all the steps the user has to go through to complete a particular task. The omission of screenshots, or, rather, the incorporation of only selected screenshots, can also confuse the user by creating a disconnect between the directions and illustrations.

The creation of tutorials can also be time-consuming and frustrating. Specifically, the creation of a tutorial involves setting up and taking screenshots, writing directions and explanations, storing, tracking, and combining images and text, and laying out the images and text to finally publish the tutorial on an intranet, for instance, or as an application tutorial. While the tutorial can be improved by having the tutorial writer prepare better instructions, taking more screenshots and better arranging and managing the instructions and screenshots, this is very time consuming and will sometimes discourage the creation of helpful tutorials.

In another approach, Flash/QuickTime animated tutorials have been used. These are animated tutorials that have text and/or voice explanations along with animated cursors and changing screenshots to guide users through a particular task. However, this approach is often unsatisfactory as well because it may not stop or pause to allow the tutee to complete the steps, or the tutorial may pause or stop at points that are not optimally helpful to the tutee. In another approach, Flash/QuickTime animated tutorials have been used. These are animated tutorials that have text and/or voice explanations along with animated cursors and changing screenshots to guide users through a particular task. However, this approach is often unsatisfactory as well because it may not stop or pause to allow the tutee to complete the steps, or the tutorial may pause or stop at points that are not optimally helpful to the tutee.

BRIEF SUMMARY OF THE INVENTION

The present invention addresses the above and other issues by providing a technique for automatically capturing screenshots on a computer display to assist in building a tutorial, such as for demonstrating the functionality of one or more applications. The technique provides users who are preparing tutorials, such as help desk personnel and administrators, with an easier and better way of creating more comprehensive tutorials that eliminate the confusion which arises from complicated text and spotty inclusion of screenshots, while also reducing the time and effort required to prepare the tutorial. The users can focus on creating the tutorial rather than having to take screenshots and manage those images in addition to synchronizing them with text. Moreover, the user can output the tutorial to a file or web page for subsequent viewing by one or more tutees, and is generally applicable to any purpose that benefits from the automatic capture of screenshots.

In one aspect of the invention, a computer-implemented method for building a tutorial includes automatically capturing at least one image that is generated by at least one application with which a user interacts, and that is displayed on a user interface, and building a tutorial using at least a portion of the at least one captured image.

In another aspect, a computer-implemented method for automatically capturing images includes detecting a change in images that are generated by at least one application with which a user interacts, and that are displayed on a user interface, automatically capturing at least one of the images responsive to the detecting of the change, and building a tutorial using at least a portion of the at least one captured image.

In a further aspect, a computer-implemented method for building a tutorial includes detecting an event that is generated by at least one application with which a user interacts, automatically capturing, responsive to the detecting of the event, at least one image that is generated by the at least one application, and that is displayed on a user interface, and building a tutorial using at least a portion of the at least one captured image.

In yet another aspect, a computer-implemented method for automatically capturing images includes automatically capturing at least one image that is generated by at least one application with which a user interacts, and that is displayed on a user interface, automatically editing the at least one captured image to provide at least one edited image, and building a tutorial using at least a portion of the at least one edited image.

Corresponding program storage devices are also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 4 illustrates an image-editing menu for use in a tutorial builder application;

DETAILED DESCRIPTION OF THE INVENTION

Figure 1:
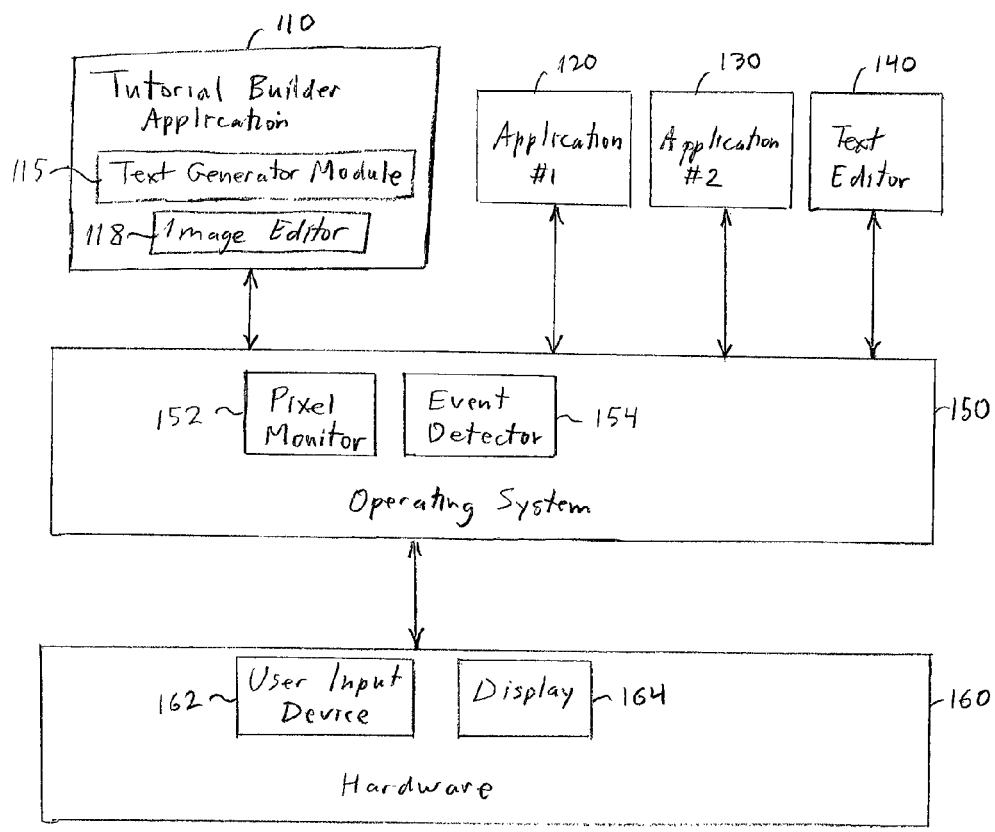
FIG. 1 illustrates an architecture for implementing a tutorial builder application.

FIG. 1 illustrates an architecture for implementing a tutorial builder application. In one possible approach, a tutorial builder application 110 can be used to generate a tutorial that demonstrates the functionality of one or more other applications, such as application #1 (120) and application #2 (130). The applications which are the subject of the tutorial can include, e.g., a suite of office programs, such as word processing programs, spreadsheet programs, presentation software programs, and drawing programs, as well as computer-aided design (CAD) programs and the like, or essentially any other type of application or program, independently or in conjunction with one another. That is, the invention is not restricted to generating tutorials demonstrating a single application, but can demonstrate tutorial flows across the entire operating environment. The tutorial builder application 110 can include a text generator module 115, described further below, that runs in the same process or program as the tutorial builder application 110, and which is used to automatically generate text for the tutorial that is built by the tutorial builder application 110. The tutorial builder application 110 can also include an image editor module 118, described further below, that runs in the same process or program as the tutorial builder application 110, and which is used to automatically edit captured images for use in the tutorial. Additionally, a text editor 140 may be a conventional program such as the Windows Notepad or Emacs on Unix that allows the user to enter text.

An operating system level 150 of the architecture may include a pixel monitor 152 for determining when changes have occurred in the images on the user interface that are generated by the applications that are the subject of the tutorial. The pixel monitor 152 can detect changes in the displayed images by monitoring the images themselves. For example, the values of pixels that make up the user interface can be monitored so that a change in pixel values in a portion of the user interface can signal a change in the image, thereby triggering an automatic image capture by the tutorial builder. Furthermore, a bounding box or other contour can be defined around the changed pixels for use in editing the captured image, e.g., to crop around the changed pixels for display in the tutorial. The pixel data can be accessed, e.g., from the applications that generate the images on the user interface.

The operating system level 150 of the architecture may also include an event detector 154 for detecting events that are generated by the applications that are the subject of the tutorial. For example, the event detector 154 may use an accessibility toolkit (ATK) which receives information from application #1 (120), application #2 (130), and the text editor application 140, to detect events such as a window opening or closing, a user clicking on a control, a user selecting an item in a menu, a user entering text into a control, a window being moved, resized, maximized or minimized, or a control or an icon being dragged from one point to another. The applications 120, 130 and 140 can have a library for ATK automatically loaded that automatically communicates events to a central ATK program in the event detector 154.

A control refers to, e.g., an object in a window or dialog box that allows a user to interface with the application and operating system. Examples of controls include push-buttons, scroll bars, radio buttons, pull-down menus, dialog boxes, pop-up windows, pull-down menus, icons, resizable window edges, progress indicators, selection boxes, windows, tear-off menus, menu bars, toggle switches and forms. Information from the event detector 154 can be automatically loaded into the text generator module 115, e.g., during start up of the computer.

One example of an ATK is that developed by GNOME, a Unix and Linux desktop suite and development platform, for management of assistive technologies, which are added to computers to make them more accessible to the disabled. The assistive technologies may include, e.g., screen magnifiers, screen readers, on-screen keyboards, keyboard enhancement utilities for people who have trouble typing and controlling a mouse, speech recognition programs, and alternative input devices such as smaller or larger keyboards, eye-gaze pointing devices, and sip-and-puff systems controlled by breathing.

The event detector 154 can therefore provide programmatic access to a significant amount of information regarding controls, e.g., windows, menus, buttons, and so forth, which generate events when there are changes in the displayed images. For example, the event detector can be configured as a tree of objects which each have properties. For instance, objects may indicate that a display contains a window, a window contains controls, a control contains other controls, a control contains text, and so forth. The properties may indicate that a button has a title or label, a check box is in a checked or unchecked state, and so forth. Moreover, the program information maintained by the event detector 154 can be used by the text generator module 115.

For example, pseudocode that could be used by the text generator module 115 is as follows:

```
receive_event(eventGenerator) {
  if (eventGenerator.type == 'button') {
    buttonLabel = button.label;
    if (eventGenerator.buttonType == 'toggle') {
      buttonType = "toggle button"
    } else {
      buttonType = "button"
    }
    generatedText = "Click on the " + buttonType + " entitled " + buttonLabel;
  } else if (eventGenerator.type == 'menu') {
    generatedText = "Select menu item " + eventGenerator.menuLabel;
  } else.... etc ....
```

Thus, if an event type of "button" is generated by the application #1 (120), for instance, the event type is detected by the event detector 154 and provided to the text generator module 115. The text generator module 115 can then generate text accordingly, as illustrated in further detail below.

A combination of techniques for determining when to trigger the automatic capture of an image, such as both event detection and pixel change detection, can also be used.

Hardware 160 in the architecture of FIG. 1 can include a user input device 162, such as a mouse, which is operated by the user to interact with the applications 110, 120, 130 and 140, and a display device 164 for providing a user interface which displays the images generated by the applications 110, 120, 130 and 140.

Figure 2:
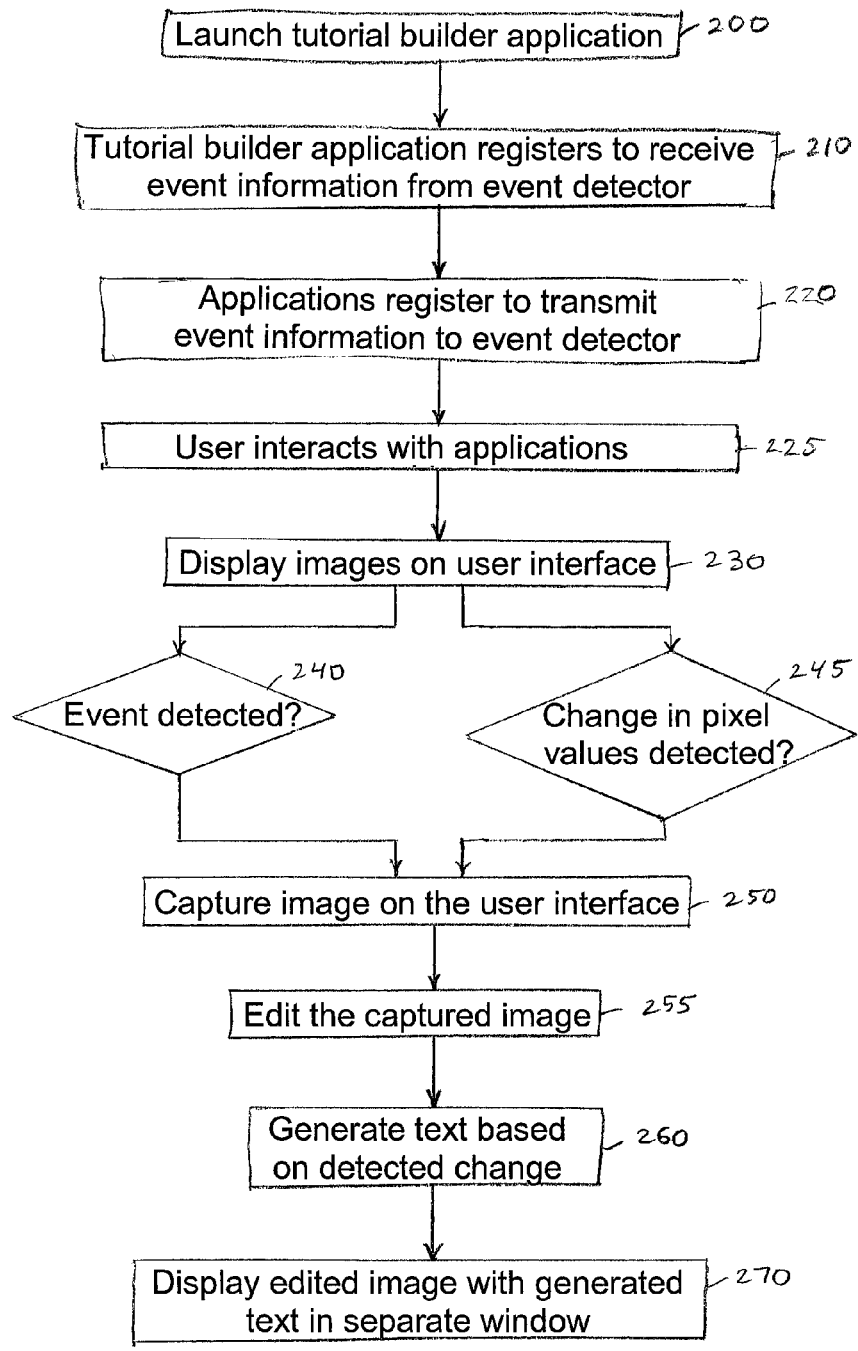
FIG. 2 illustrates a flow chart of a method for implementing a tutorial builder application.

FIG. 2 illustrates a flow chart of a method for implementing a tutorial builder application. At block 200, a user who is preparing the tutorial launches the tutorial builder application. This can be achieved in the same way that other applications are commonly launched. For example, in a desktop environment, the user can click on a "tutorial builder" icon on the desktop, or the user can click on a executable "tutorial builder" file. At block 210, the tutorial builder application registers to receive event information from the event detector 154, when used. This allows the tutorial builder to receive event information from the applications 120, 130 and 140, for instance. At block 220, the applications 120, 130 and 140 register with the event detector 154, when used, to transmit event information to it. At block 225, the user interacts with the one or more applications that are to be the subject of the tutorial. Advantageously, once the tutorial application has been launched, the user can simply interact with the one or more applications normally, such as by using the user input device 162, without interference by the tutorial application. The user typically will desire to demonstrate a specific functionality of the applications, such as specific features or sequences of commands, for the tutorial.

At block 230, images are displayed on the user interface. The images can be generated by the applications based on a direct response to an input by the user, such as pulling down a menu to select a menu item, which in turn results in a new window being opened, or based on actions that are initiated by the applications, such as displaying a status message, or a clock-driven, reminder message, e.g., "upcoming meeting at 3 pm". Again, these are images that are normally displayed by the one or more applications. Further details regarding an example series of images are discussed below. At block 240, if an event is detected by the event detector 154, or if there is a change in the image based on a detected change in pixel values by the pixel monitor 152, for example, at block 245, the current image is automatically captured (block 250) without requiring a specific capture command from the user. For example, an image file, e.g., in a GIF or other suitable format, may be stored to a designated tutorial file location. The current image can then be automatically captured, e.g., as a screenshot.

At block 255, the image may be automatically edited by the image editor module 118, e.g., without requiring a specific edit command from the user. For instance, the images may be edited to provide a focus on a portion of the captured image, such as the portion that has changed in the current image relative to a previous image, as determined by the pixel monitor 152, for instance, and, optionally, related portions. For example, a focus may be provided for a new window in an image and related, parent windows, if any. Or, a focus may be provided for a new pull down menu in an image and related parent menus, if any. When the image capture is triggered based on the generation of an event, the captured image may be edited to provide a focus on a portion of the captured image from which the event originated and, optionally, related portions. In the above examples, the new window or menu may be the portion of the captured image from which an event originated.

Furthermore, the focus may be provided in various ways. For example, the captured image may be edited by cropping out a background portion of the captured image for which there is no focus. Or, the captured image may be edited by de-emphasizing a remaining portion of the captured image, such as by darkening the remaining portion, desaturating at least one color channel of the remaining portion, blurring the remaining portion, and/or overlaying a partially transparent shape over the remaining portion. An edited version of the image, which is provided in the tutorial, may be stored separately from the unedited version to enable the user to subsequently change the editing of the image. Editing of captured images is discussed and illustrated in further detail below.

At block 260, text may be generated to accompany each of the captured images, as discussed previously, and as illustrated further below. For example, the text generator module 115 may generate text, as discussed above, based on the detection of events generated by the one or more applications or based on the detection of changes in the displayed images on the user interface. The text may be stored in the designated tutorial file location so that it appears with the corresponding captured, edited, images in the tutorial.

At block 270, the edited image and the corresponding text are displayed in a separate tutorial window. In one possible approach, the tutorial window is overlaid on top of the user interface on which the one or more applications are running. In another approach, a multi-screen display is used, and the tutorial window is provided on a separate screen. Advantageously, the user can monitor the tutorial as it is built to confirm that the captured images and generated text are satisfactory. The user can enter commands to manually edit the automatically edited images if they are not satisfactory, as well as entering commands to adjust the automatic editing that is applied to some or all of the captured images. Furthermore, the user can edit the automatically generated text such as by clicking into a control such as a text box in which the text is provided, and typing in the desired changes. However, it is not necessary to display the tutorial as it is being built. Instead, the user may view the tutorial after it has been completed, at which time any desired edits to the images and text can be made before publishing the tutorial.

Once the tutorial is completed, the user can enter a command to terminate the tutorial builder application. The tutorial can be saved as one or more files in which images and text are provided in a way that a student or tutee can subsequently open the tutorial and review the images and text to learn how to use various features, or functionalities, of one or more applications that are the subject of the tutorial. The tutorial window can also be provided as a web page. The tutorial may be useful, e.g., in training employees or students, in providing product help or support, or in documentation. Furthermore, animated tutorials can be created by producing a cursor animation between captured images, e.g., screenshots, and including the text. The tutorial may be made available on a network such as an intranet or the Internet for widespread access.

Figure 3:
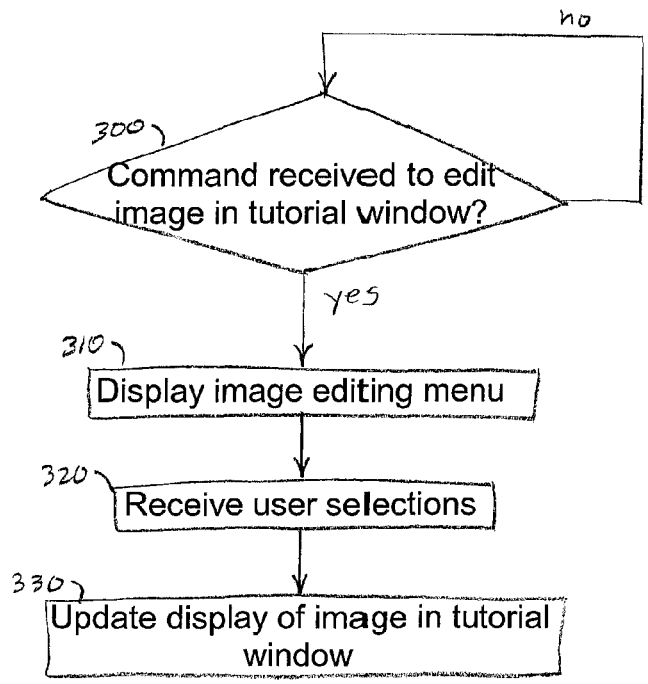
FIG. 3 illustrates a flow chart of a method for editing images in a tutorial builder application.

FIG. 3 illustrates a flow chart of a method for editing images in a tutorial builder application. The tutorial application may allow the user to adjust the automatic editing that is applied to each of the captured images, or to edit one or more selected images. At block 300, a command is received from the user to edit a selected image in the tutorial window, or to change the editing generally. In response, at block 310, an image-editing menu providing various editing options from which the user can select is displayed on the user interface. The user's selections are received at block 320 via the menu, and at block 330, the display of the selected image, or all of the images, is updated in the tutorial window. That is, the editing changes are applied to the selected image, or the images generally. The user can then review the edited images to ensure they are satisfactory and to make any further adjustments, if desired. An image-editing menu such as provided in FIG. 4 may be used.

FIG. 4 illustrates an example image-editing menu 400 for use in a tutorial builder application, such as in the image editing module 118. The menu 400 can be accessed by a pull down menu or other control in the tutorial builder window, for instance. Alternatively, the user may select one or more particular images in the tutorial and right click to cause the menu 400 to be displayed. The image-editing menu may allow the user to set options such as whether to display the full user interface screen in the tutorial, display only changed objects and related parent objects, such as a new window and its parent windows, or a new pull down menu and its parent menus, or display only changed objects, but not any parent objects, such as a new window but not its parent windows, or a new pull down menu but not its parent menus. The term "object" is meant to encompass any visually distinguishable component that is displayed on the user interface. The image-editing menu 400 may additionally allow the user to provide a focus on a portion of the captured image by cropping out the portion, e.g., displaying the focused portion by itself, while eliminating the remaining, unfocussed portions, or by displaying the focused portion with the remaining portions, while de-emphasizing the remaining portions. Examples of cropping and de-emphasizing and provided below.

The image-editing menu 400 may additionally allow the user to choose to replace multi-option windows in the tutorial after one of the options is selected. Multi-option windows include, e.g., alert windows that prompt the user as to whether or not they wish to carry out a command such as closing a window. The tutorial can be made concise by automatically including in the tutorial only the alert window that shows the selected option rather than also including the alert window prior to the selection. Examples are provided below.

The user can further designate, e.g., whether to apply the edit selections to only a selected image, if appropriate, all images in the tutorial, or selected and subsequently captured images. Various other approaches will be apparent to those skilled in the art for enabling a user to adjust the editing options.

Moreover, preset layouts can be defined, e.g., by a company, school, or the like, into which the text and images are formatted. The layouts can indicate that the images should appear on the left hand side of the tutorial with text on the right, provide a company logo on each page of the tutorial, and so forth.

The following figures illustrate an example sequence of user interface images and their capture into a tutorial according to the invention. As mentioned, the invention can be adapted for use in providing a tutorial for essentially any type of application or applications.

Figure 5:
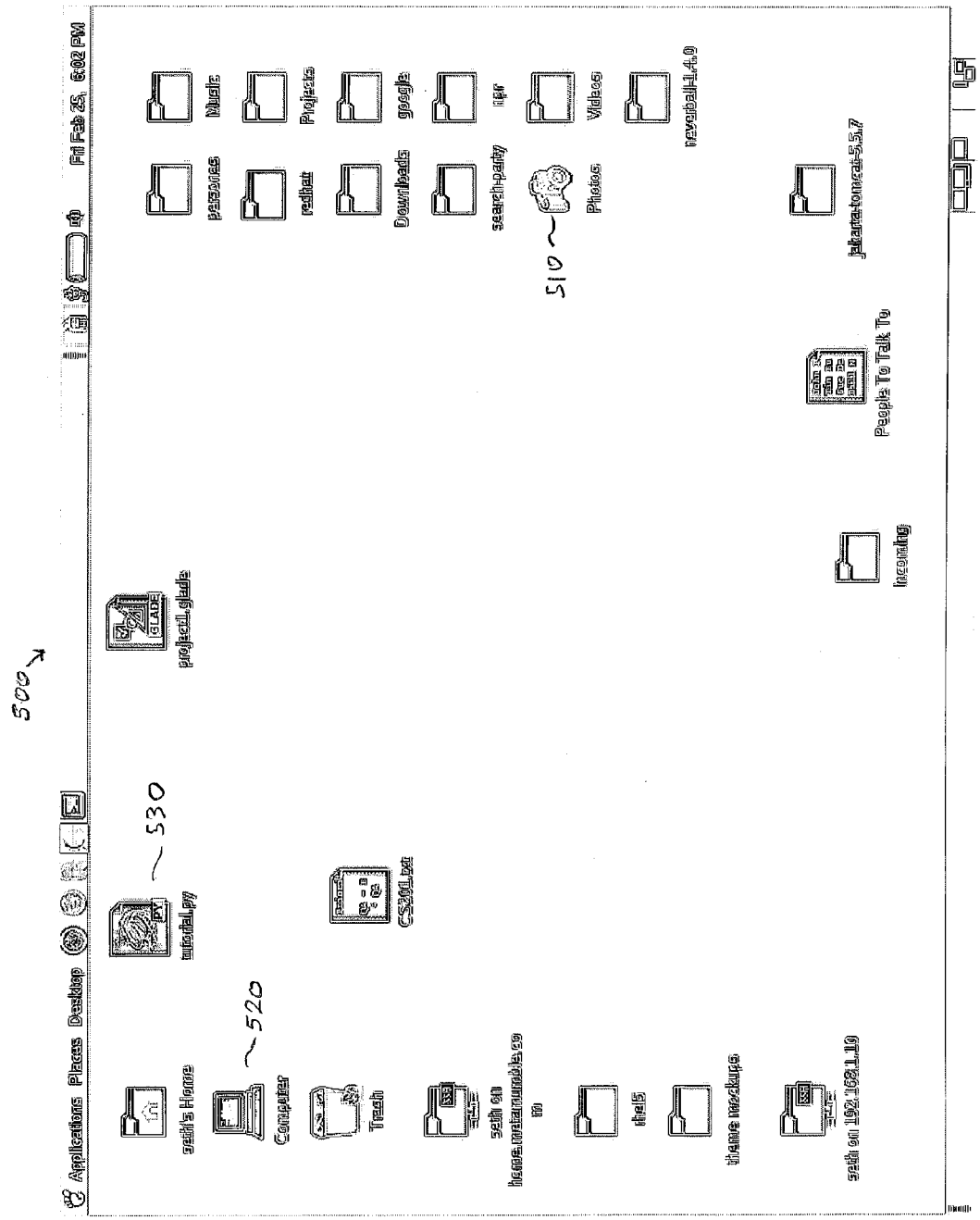
FIG. 5 illustrates a desktop view of a user interface.

FIG. 5 illustrates a desktop view of a user interface 500. Such desktop views are well known per se and can include a number of different controls, such as icons, which allow the user to launch different programs/applications or access resources on a computer. The desktop itself may also be considered to be an application. For example, the icon entitled "photos" 510 may launch an application for viewing and editing digital images. An icon entitled "Computer" 520 allows the user to access files stored on the computer. An icon entitled "tutorial.py" 530 can be clicked on by the user using a mouse or other pointing device to launch the tutorial application. Once the tutorial application is launched, a tutorial builder application window 600 (FIG. 6) may open on the user interface 500, such as on a side of the user interface 500 or on a separate screen, if available, so that the user is still free to interact with the desktop.

Figure 6:
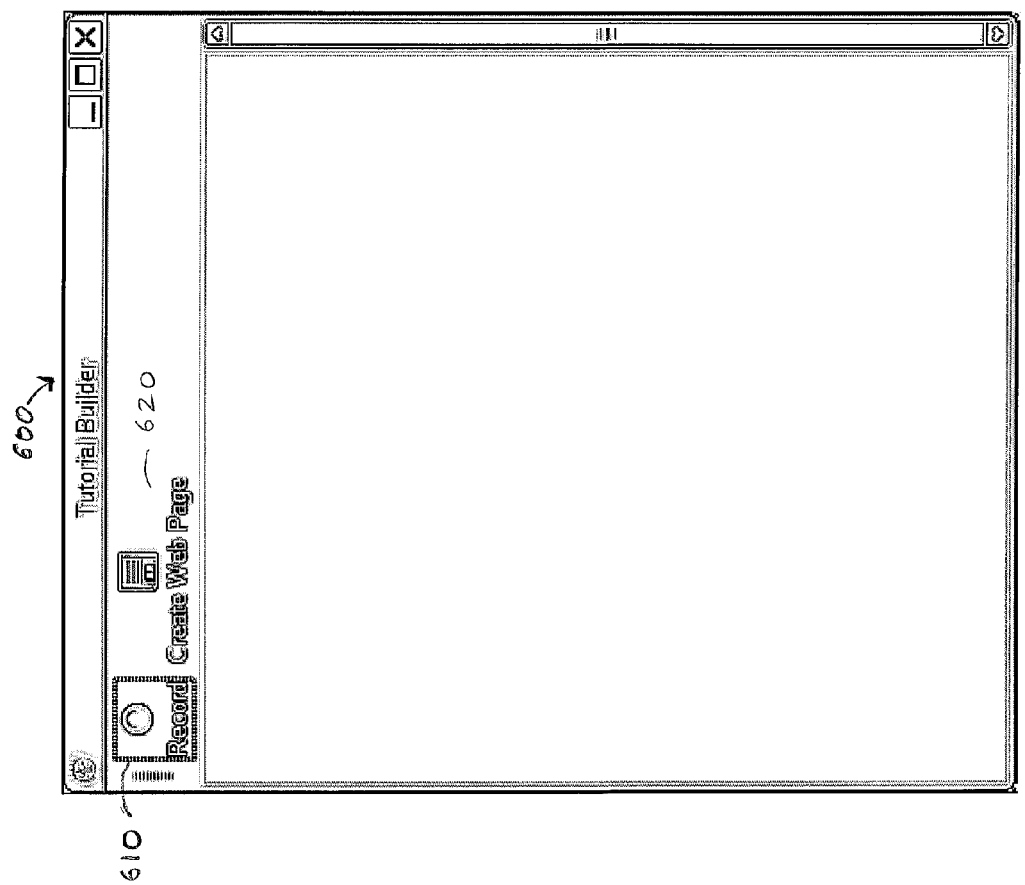
FIG. 6 illustrates a tutorial builder application window, where a user enters a command to begin recording.

FIG. 6 illustrates a tutorial builder application window 600, where a user enters a command to begin recording by pressing an icon entitled "record" 610. The tutorial builder can capture an image of the desktop in its current state to establish an initial context for the tutorial. This capturing of an image is also referred to as taking a screenshot. The tutorial builder application window 600 may also include an icon 620 entitled "create a web" page which, when selected by the user, outputs the images and text of the tutorial to a preformatted web page, e.g., on a local hard disk. The user can then edit the web page, using any tool of their choosing, and/or upload it to the web. The preformatted web page can be provided according to a format that is selected by the user from among a number of available formats.

Figure 7:
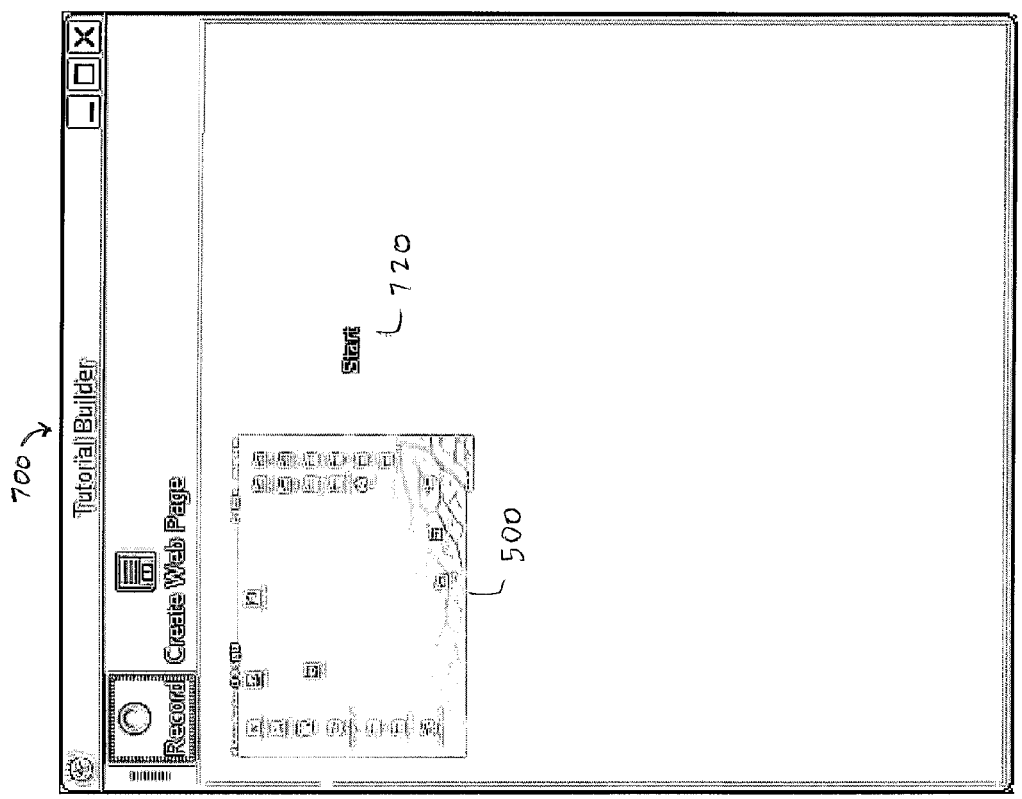
FIG. 7 illustrates the tutorial builder application window, in which a screenshot of the desktop view of FIG. 5 is automatically captured and displayed.

FIG. 7 illustrates the tutorial builder application window 700, in which a screenshot of the desktop view 500 of FIG. 5 is automatically captured and displayed. Additionally, automatically generated text is displayed next to the captured image 500. For example, text such as "Start" 720 may be displayed when the first image is captured. The text may be generated by the text generator module 115 (FIG. 1) as discussed previously.

Figure 8:
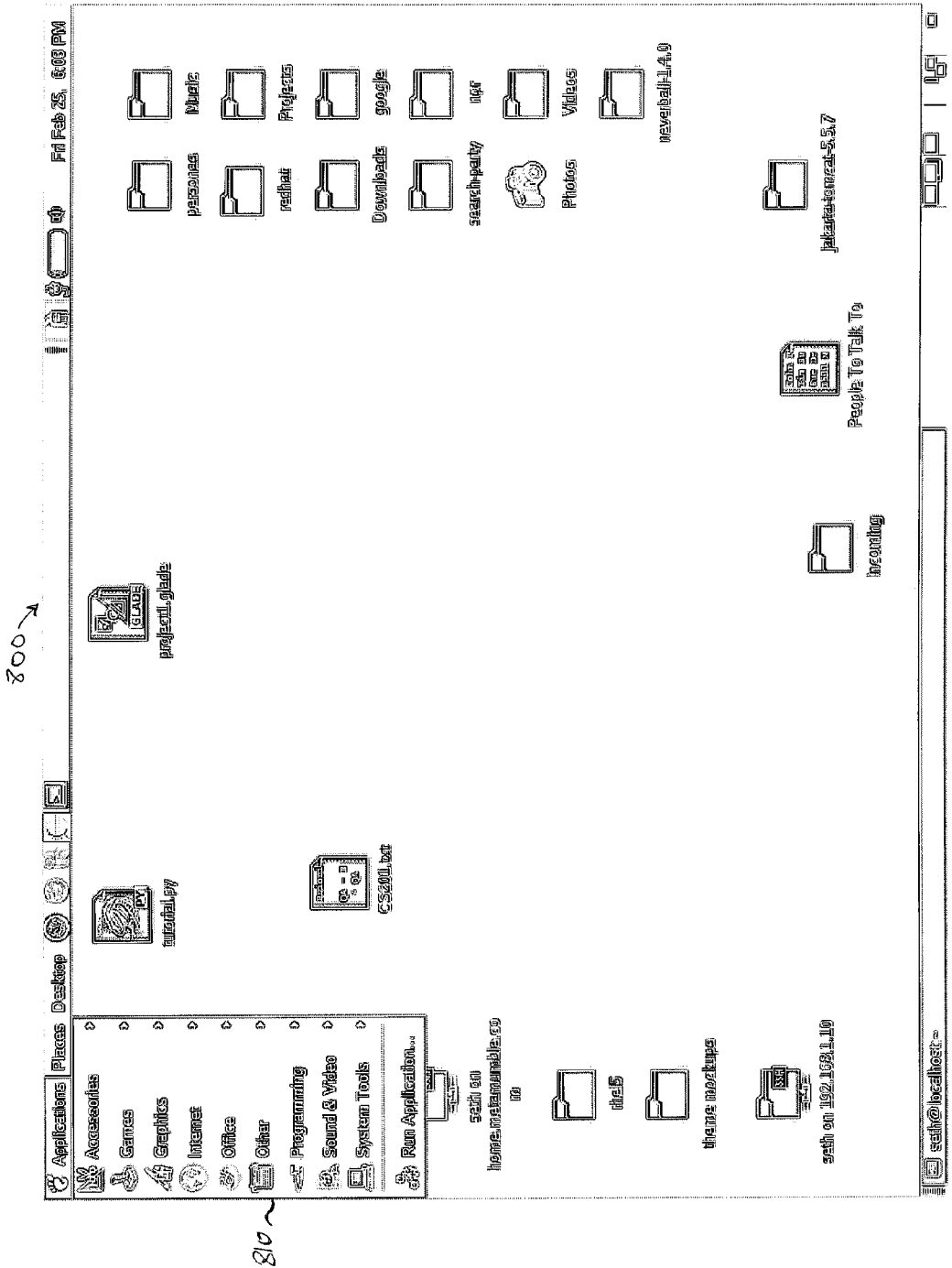
FIG. 8 illustrates the desktop view of the user interface, where the user pulls down a first level of a menu.

FIG. 8 illustrates the desktop view of the user interface 800, where the user pulls down a first level of a menu 810. When the user pulls down the menu, the event detector 154, such as the accessibility toolkit, or a program that recognizes changes in the user interface based on pixel values, such as the pixel monitor 152, generates a corresponding signal. In response, the tutorial builder application again automatically captures the image of the user interface 800, including the menu 810.

Figure 9:
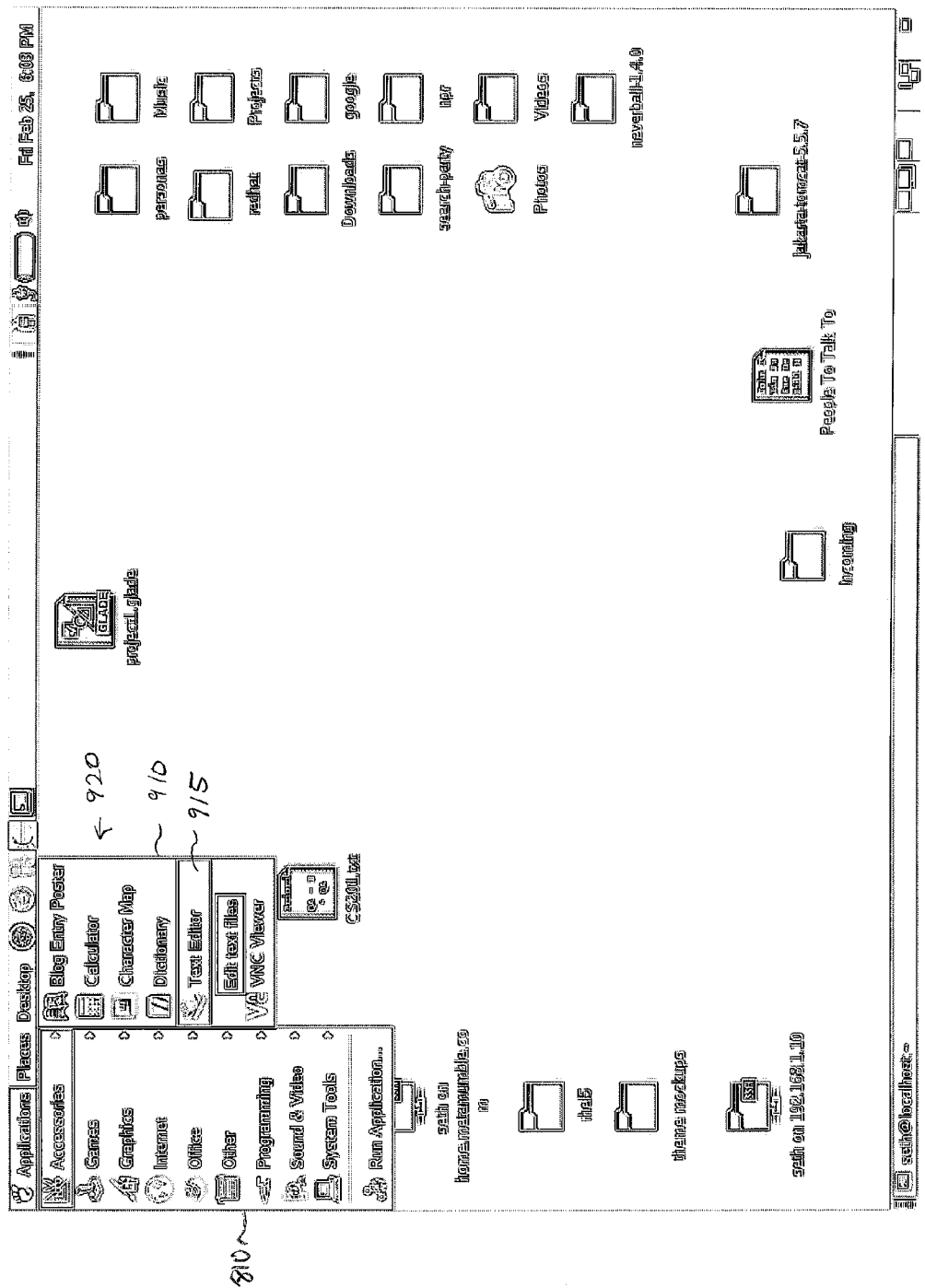
FIG. 9 illustrates the desktop view of the user interface, where the user selects a second level of the menu of FIG. 8.

FIG. 9 illustrates the desktop view of the user interface 900, where the user selects a second level 910 of the menu 810 of FIG. 8, and, further, selects a menu item entitled "Text Editor" 915, which launches the text editor application 140. In one possible approach, the event detector 154 receives an event reporting that a menu item has been clicked on. Using a widget tree accessible through the accessibility toolkit, for example, the tutorial builder figures out what screen area contains the selected menu item and all its parent menus, if any. In the present example, the menu 810 is a parent menu of the menu 910. The tutorial builder application then captures an image of the entire user interface 900 and the image editor module 118 automatically edits the captured image based on the previously set editing settings or criteria, e.g., as set by the image-editing menu 400 of FIG. 4. For example, the captured image may be edited by providing a focus on the portion of the image that results in the detected event or the change in the image. In the present example, this portion is the menu 910. Additionally, the editing may include the parent menu 810 in the focus. The focus can be provided by cropping out or de-emphasizing background portions of the image that do not include the menus 810 and 910, collectively shown at 920. Furthermore, text can be automatically generated for use in the tutorial as discussed.

Figure 10:
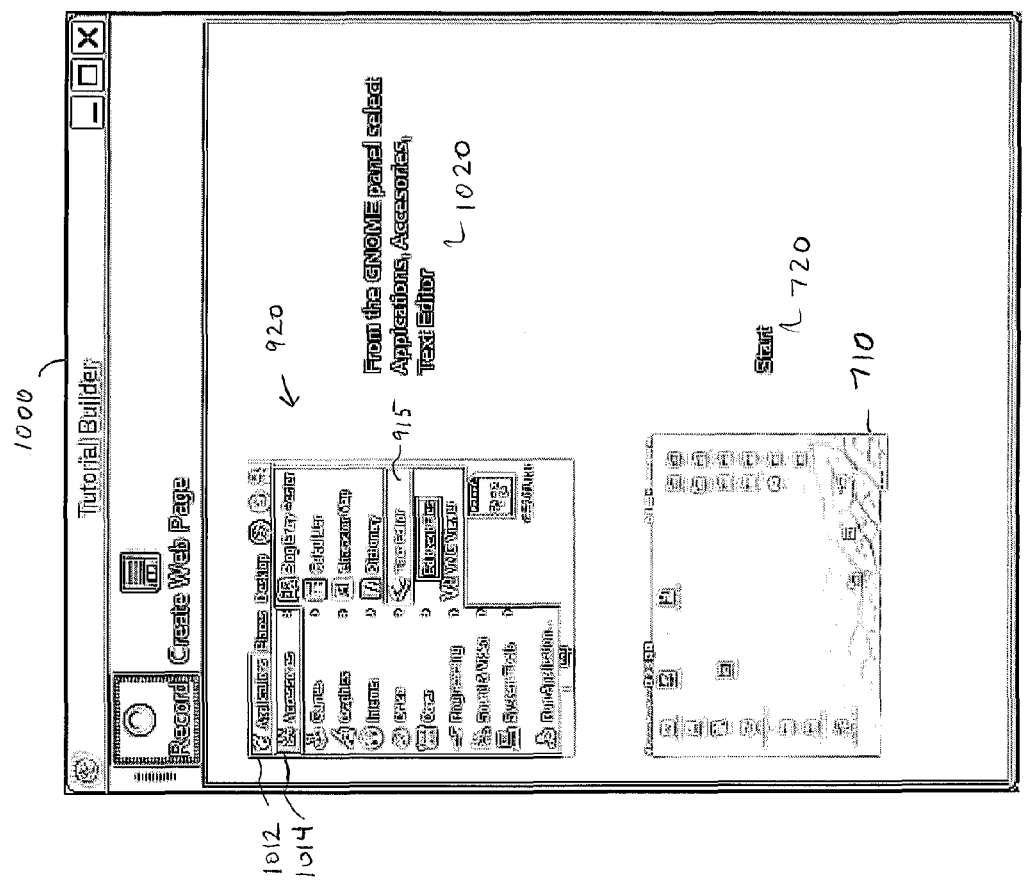
FIG. 10 illustrates the tutorial builder application window, in which a screenshot of the desktop view with the pulled down menus of FIG. 9 is automatically captured, but only the pulled down menus are displayed.

FIG. 10 illustrates the tutorial builder application window 1000, in which a screenshot of the desktop view with the pulled down menus of FIG. 9 is automatically captured, but only the pulled down menus are displayed. Here, the background portions of the image are cropped out so that only the parent menu 810, also referred to as a top-level or first-level menu, and the child menu 910, also referred to as a second level menu, are displayed in the tutorial, as shown by the image 920. Additionally, the automatically generated text 1020 reads, "From the GNOME panel select Applications, Accessories, Text Editor." This text is generated by recognizing that the user interacted with a panel entitled "GNOME", pulled down a menu entitled "Applications" 1012, then selected a menu item entitled "Accessories" 1014, causing the second level menu to appear, then selected the "Text Editor" item 915 in the second level menu.

Note that, in the present example, the image editing settings were set so that the first and second level menus are displayed together in the tutorial, e.g., as shown by the image 920, rather than displaying the first level menu in one image in the tutorial, then displaying the first and second level menus together in another image in the tutorial. This approach avoids displaying intermediate steps in the tutorial that are not needed for comprehension, thereby making the tutorial more concise. However, it is also possible for the editing settings to be set so that a separate image is displayed in the tutorial for each new level of a menu or window, for instance, which appears in the user interface.

Figure 11:
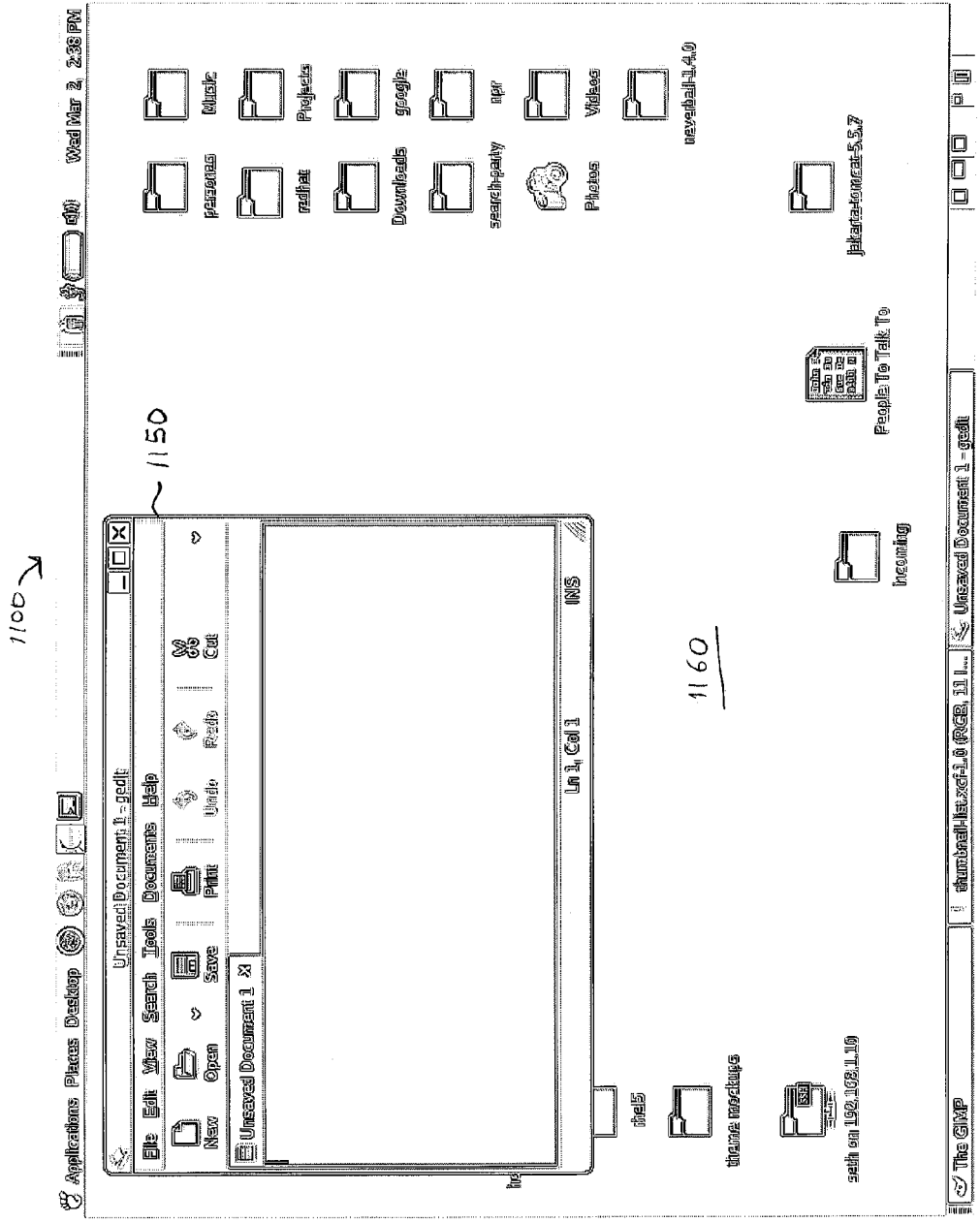
FIG. 11 illustrates the desktop view of the user interface, where a new, top level window has opened based on selection of a menu item from the second level menu of FIG. 9.

FIG. 11 illustrates the desktop view of the user interface 1100, where a new, top level window 1150 has opened based on the user's selection of the menu item 915 from the second level menu 910 of FIG. 9. The top level "Text Editor" window 1150, which is generated by the text editor application 140, thus opens. The opening of the window 1150 may generate an event or otherwise be recognized such as by pixel changes in the interface 1100. In response, the tutorial builder captures an image of the interface 1100, and applies the editing settings to the captured image. For example, a focus may be provided on the new window 1150 that generated an event by de-emphasizing background region 1160 of the interface 1100, e.g., by darkening the rest of the screenshot. Text is automatically generated based on the event type ("New Window") and the title of the selected menu item ("Text Editor") 915, which is a type of a control or widget.

Figure 12:
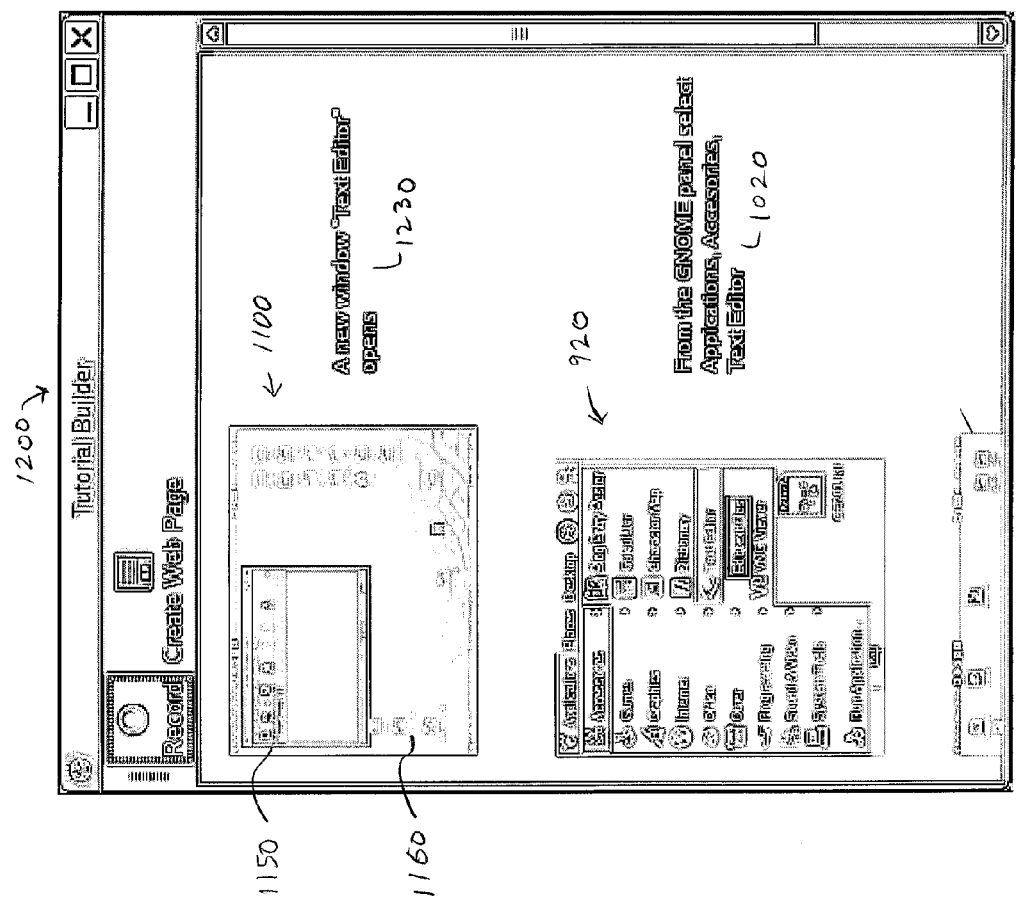
FIG. 12 illustrates the tutorial builder application window, in which a screenshot of the desktop view with the top level window of FIG. 11 is automatically captured and displayed.

FIG. 12 illustrates the tutorial builder application window, in which a screenshot of the desktop view with the top level window of FIG. 11 is automatically captured and displayed. The tutorial builder application window 1200 displays the edited image 1200, including the new window 1150 which is focused on by de-emphasizing the background region 1160, such as by darkening it. The darkening may not be apparent in the figure. The automatically generated text 1230 reads "A new window 'Text Editor' opens". The image 1100 and text 1230 are provided at the top of the tutorial builder application window 1200, while the previous images 500 and 920 and text 1020 are moved down in the window 1200 and eventually out of the window as new images are displayed. The user may have the ability to resize the window 1200 and control the resolution to thereby control the amount of information that is displayed at a given time.

Figure 13:
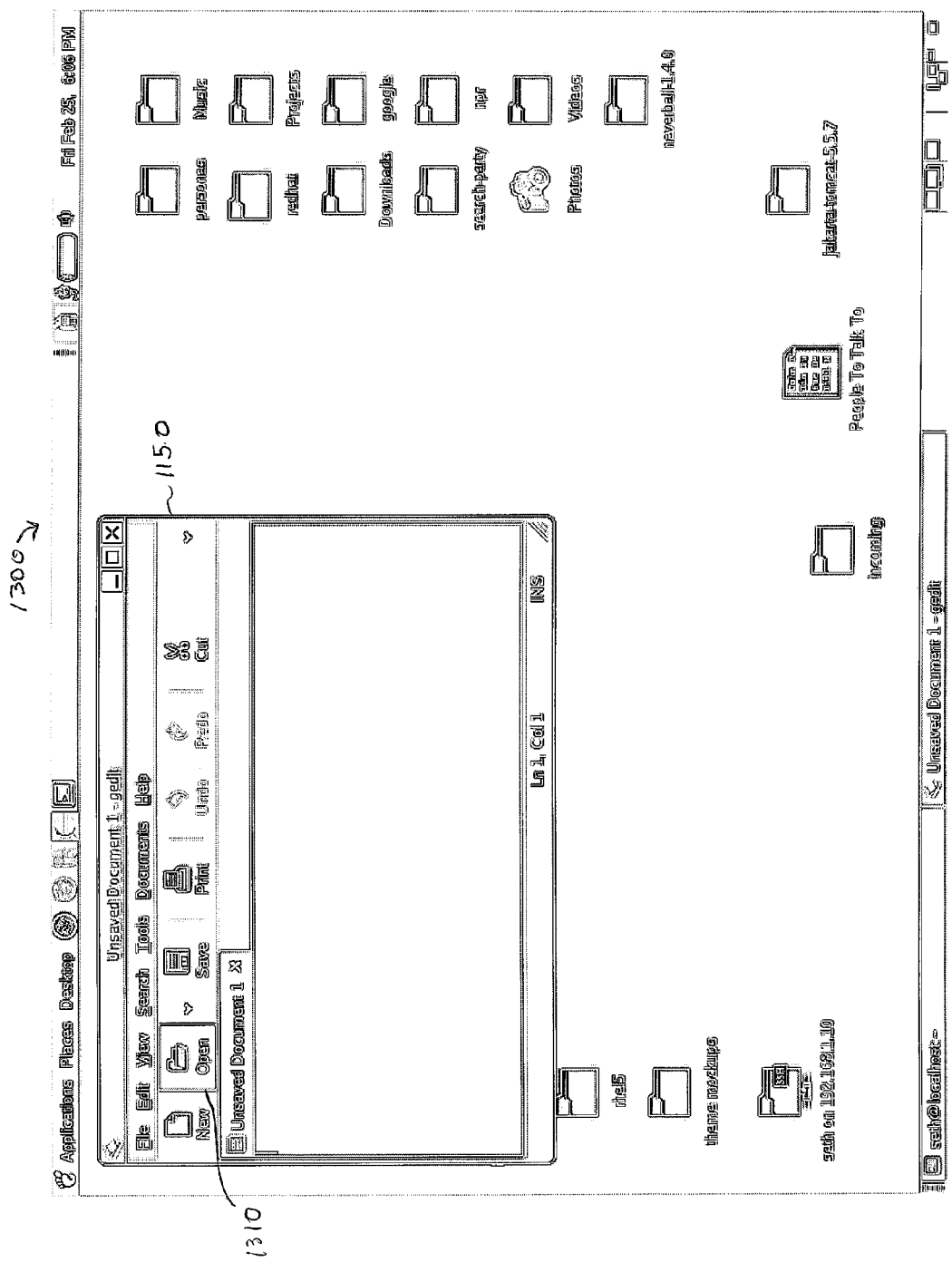
FIG. 13 illustrates the desktop view of the user interface, where the user selects the "open" toolbar button in the top level window of FIG. 11.

FIG. 13 illustrates the desktop view of the user interface 1300, where the user selects the "open" toolbar button 1310 in the top-level window 1150 of FIG. 11. When the user clicks the "open" toolbar button 1310, an event may be generated, for instance, causing the tutorial builder to examine the accessibility toolkit tree, thereby determining that the event occurred on a button inside a window. In response to this determination, the editing settings are applied to the image. For example, the captured image may be cropped so that only the window in which the selected button 1310 is located, e.g., the "Text Editor" window 1150, is displayed in the tutorial.

Furthermore, the tutorial builder may highlight the selected button 1310 by using the accessibility toolkit, for instance, to determine the button's on-screen location, and de-emphasize the remainder of the window 1300, such as by darkening.

Figure 14:
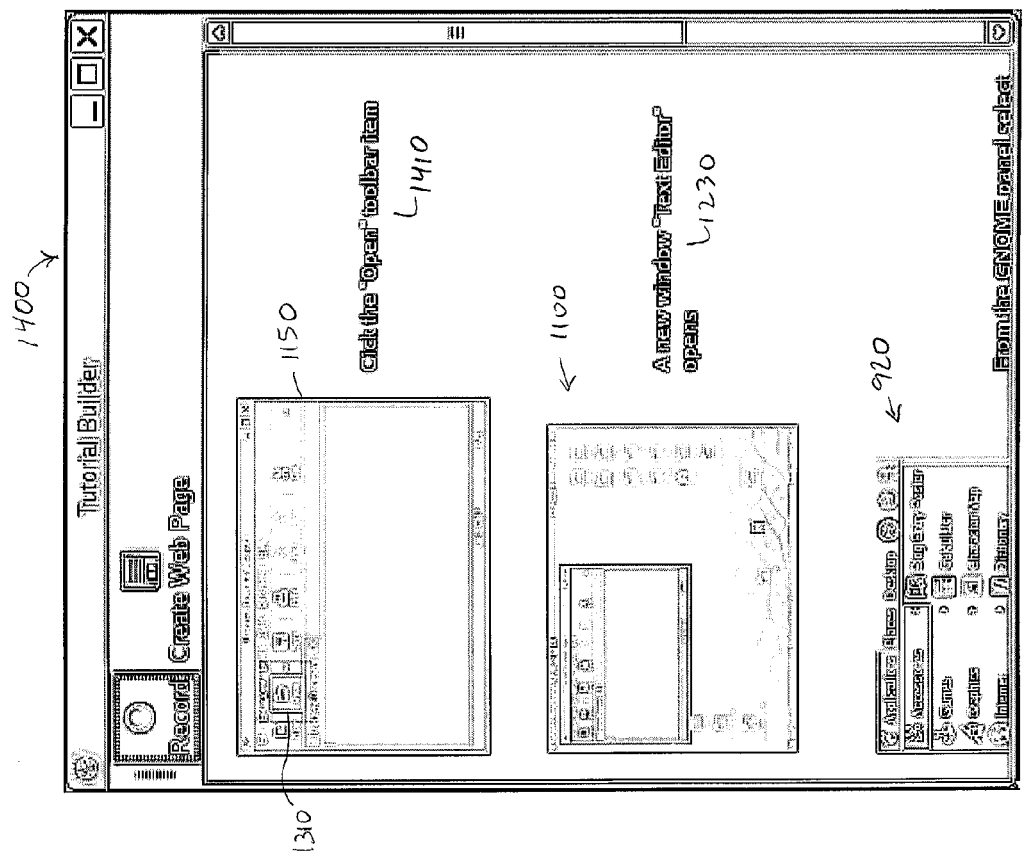
FIG. 14 illustrates the tutorial builder application window, in which a screenshot of the desktop view with the top level window of FIG. 13 is automatically captured, but only the top level window is displayed.

FIG. 14 illustrates the tutorial builder application window 1400, in which a screenshot of the desktop view with the top-level window 1150 of FIG. 13 is automatically captured, but only the top-level window 1150 is displayed. The automatically generated text 1410 is "Click the 'Open' toolbar item". This text is generated by recognizing that a particular type of a control, e.g., a toolbar item, with a particular label, e.g., "Open", was selected by the user by clicking a mouse.

Figure 15:
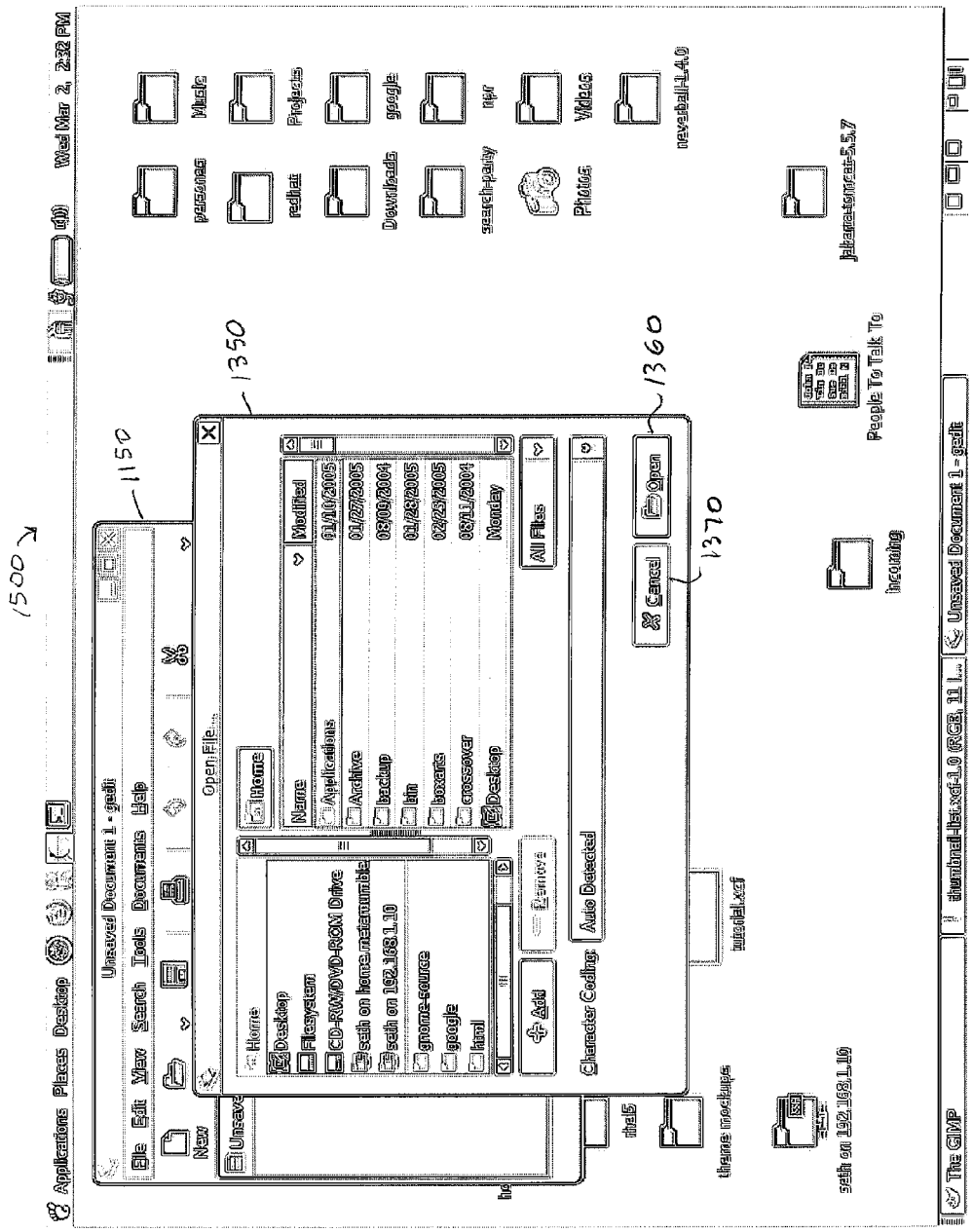
FIG. 15 illustrates the desktop view of the user interface, where a new, second level window has opened based on selection of the "open" toolbar button in the top level window of FIG. 13.

FIG. 15 illustrates the desktop view of the user interface 1500, where a new, second level window 1350 has opened based on selection of the "open" toolbar button 1310 in the top level window 1150 of FIG. 13. The opening of the second level window may result in a "New Window" event of which the tutorial builder application is informed. Additionally, the tutorial builder may determine that the window 1350 is a child window, also referred to as a second or lower level window, since it is associated with the parent, or first level, "Text Editor" window. The tutorial builder applies the editing settings, resulting, e.g., in cropping of the captured image in a square or rectangle that includes only the parent window 1150 and the child window 1350. Contrast this with the opening of the parent window 1150, as discussed in connection with FIG. 1, where the entire user interface was included in the tutorial 1200 of FIG. 12. In either case, a context is provided for the new, e.g., changed, portion of the image on the user interface. The editing settings may also dictate that the child window "Open File" 1350 be emphasized or highlighted by darkening the rest of the screenshot. The window 1350 also includes a button 1360 labeled "Open", which is highlighted, e.g., as a default rule, and a button 1370 labeled "Cancel".

Figure 16:
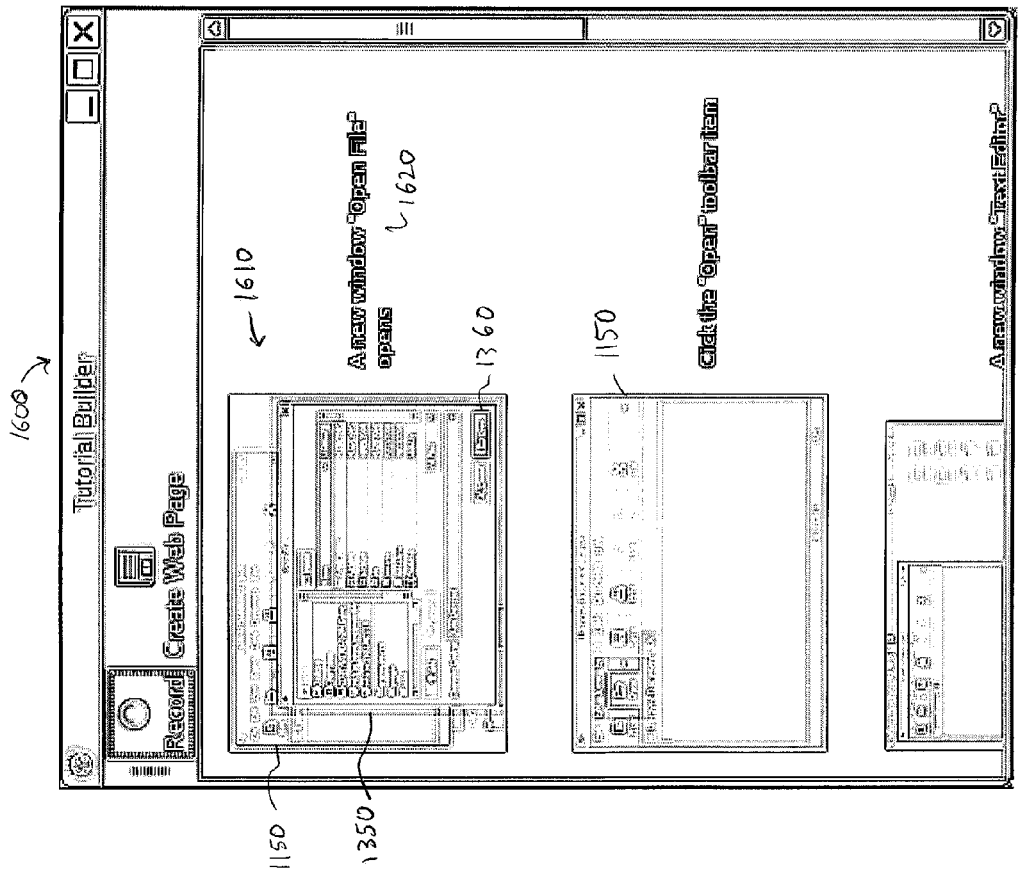
FIG. 16 illustrates the tutorial builder application window, in which a screenshot of the desktop view with the top level and second level windows of FIG. 15 is automatically captured, but only the top level and second level windows are displayed.

FIG. 16 illustrates the tutorial builder application window 1600, in which a screenshot of the desktop view with the top level 1150 and second level windows 1350 of FIG. 15 is automatically captured, but only the top level and second level windows are displayed, as collectively shown by the image 1610. The automatically generated text 1620 is "A new window 'Open File' opens". This text is generated by recognizing that a particular type of a control, e.g., a window, with a particular label, e.g., "Open File", has opened on the interface 1500.

Figure 17:
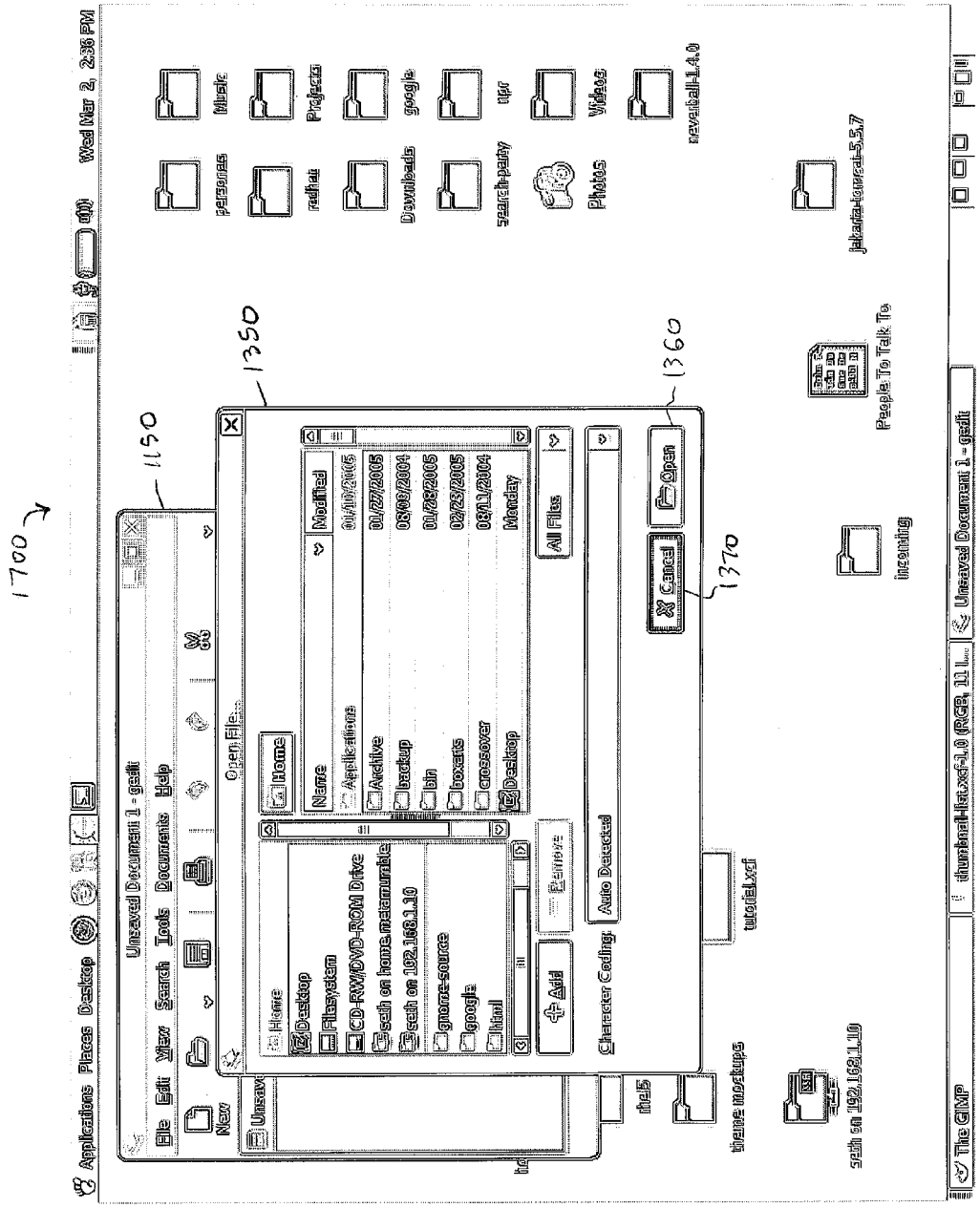
FIG. 17 illustrates the desktop view of the user interface, where the user selects the "Cancel" button in the second level window of FIG. 15.

FIG. 17 illustrates the desktop view of the user interface 1700, where the user selects the "Cancel" button 1370 in the second level window 1350 of FIG. 15, thereby causing the button 1370 to appear in highlighted form, while the highlight is removed from the "Open" button 1360. When the user clicks the "Cancel" button 1370, a corresponding event may be produced, for instance. Similar to the case of the user clicking the "Open" button 1310 in the window 1150 of FIG. 13, the tutorial application applies the editing settings to crop the captured image to include only the window 1350 in which the "Cancel" button 1370 is contained, and the area around the button 1370 is de-emphasized. Note that it is not necessary to include the parent window 1150 in the tutorial to provide a context for the child window 1350 since this context was previously established by the image 1610 in FIG. 16. However, it is possible to again include the parent window 1150 in the tutorial to maintain the previous context.

Figure 18:
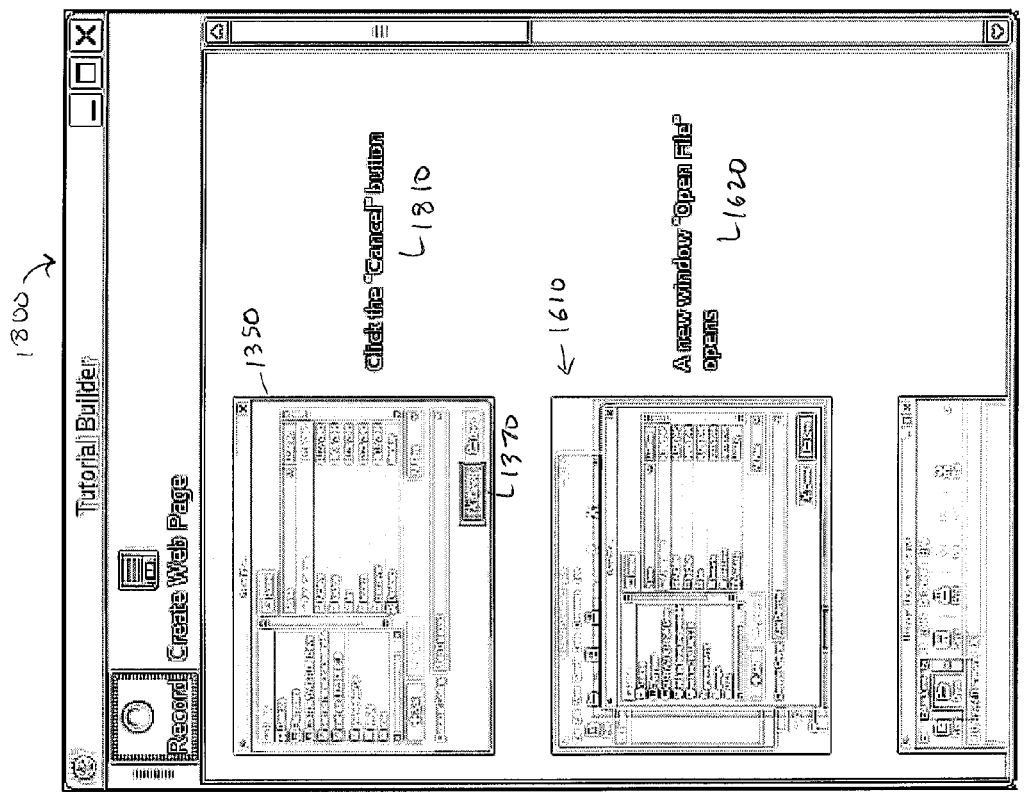
FIG. 18 illustrates the tutorial builder application window, in which a screenshot of the desktop view with the top level and second level windows of FIG. 17 is automatically captured, but only the second level window with the selected "Cancel" button is displayed.

FIG. 18 illustrates the tutorial builder application window 1800, in which a screenshot of the desktop view with the top level and second level windows of FIG. 17 is automatically captured, but only the second level window 1350, with the highlighted "Cancel" button 1370, is displayed. The automatically generated text 1810 is "Click the 'Cancel' Button". This text is generated by recognizing that a particular type of a control, e.g., a button, with a particular label, e.g., "Cancel", has been selected by the user by clicking with a pointing device.

Figure 19:
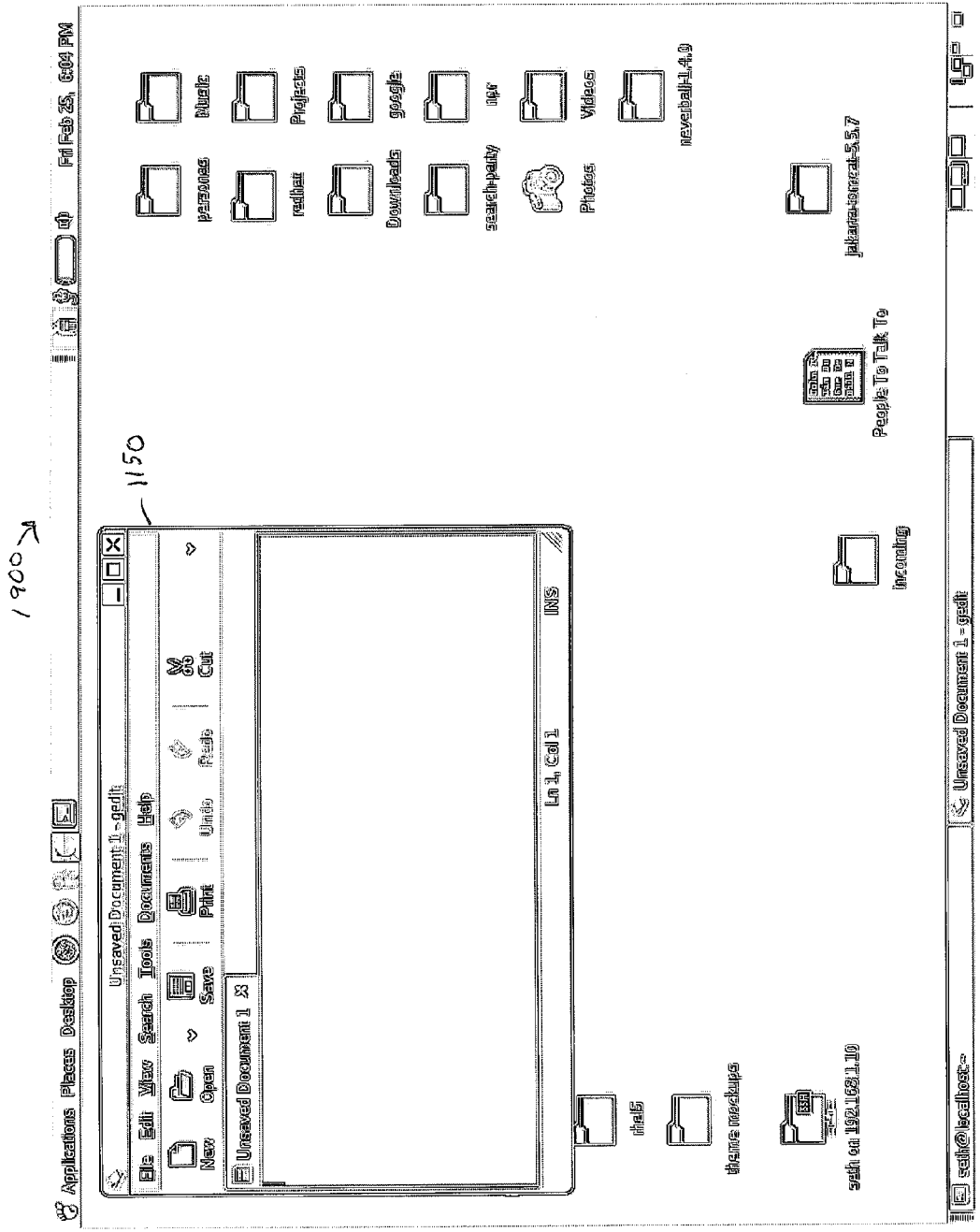
FIG. 19 illustrates the desktop view of the user interface, where the top level window remains after the second level window is closed based on selection of the "Cancel" button in the second level window of FIG. 15.

FIG. 19 illustrates the desktop view of the user interface, where the top level window 1150 remains and the second level window 1350 is closed based on selection of the "Cancel" button 1370 in the second level window 1350 of FIG. 15. The closing of the child window "Open File" 1350 may produce a "Close Window" event, which the tutorial builder application responds to by capturing the interface 1900 and displaying the parent window 1150 to re-establish a context for people reading the tutorial. As before, text can be autogenerated, such as from the accessibility toolkit event tree.

Figure 20:
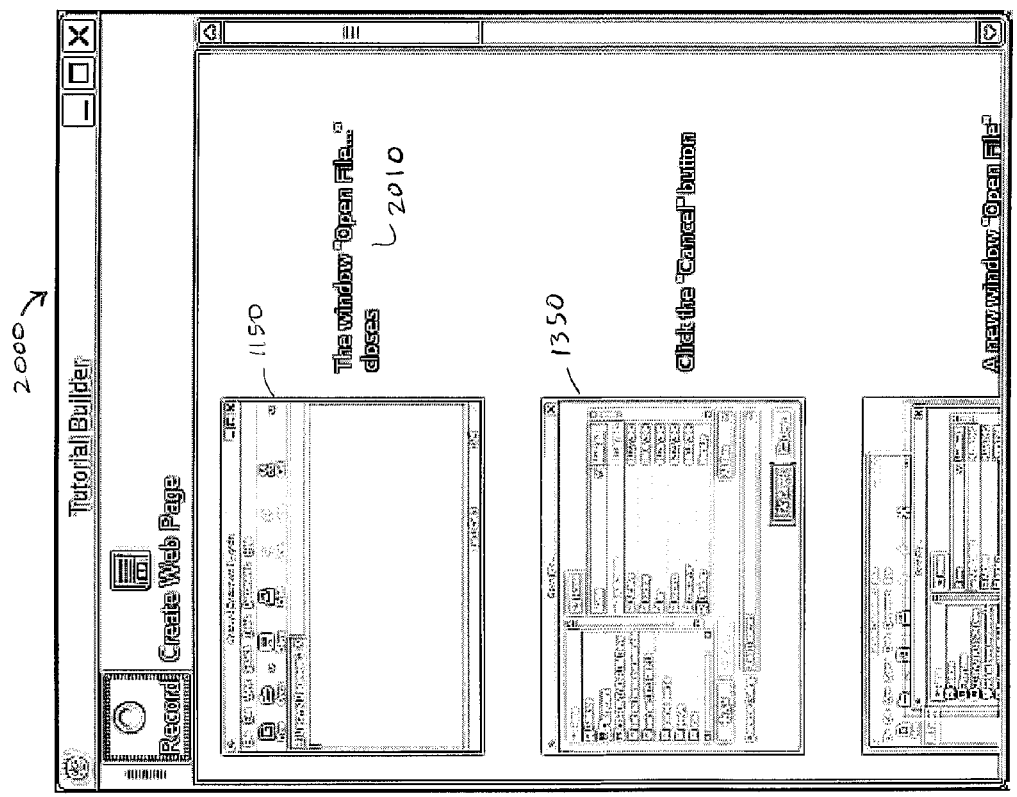
FIG. 20 illustrates the tutorial builder application window, in which a screenshot of the desktop view with the top level window of FIG. 19 is automatically captured, but only the top level window is displayed.

FIG. 20 illustrates the tutorial builder application window 2000, in which a screenshot of the desktop view with the top level window of FIG. 19 is automatically captured, but only the top-level window 1150 is displayed. The automatically generated text 2010 is "The window 'Open File . . . ' closes". This text is generated by recognizing that a particular type of a control, e.g., a window, with a particular label, e.g., "Open File", has been closed.

Figure 21:
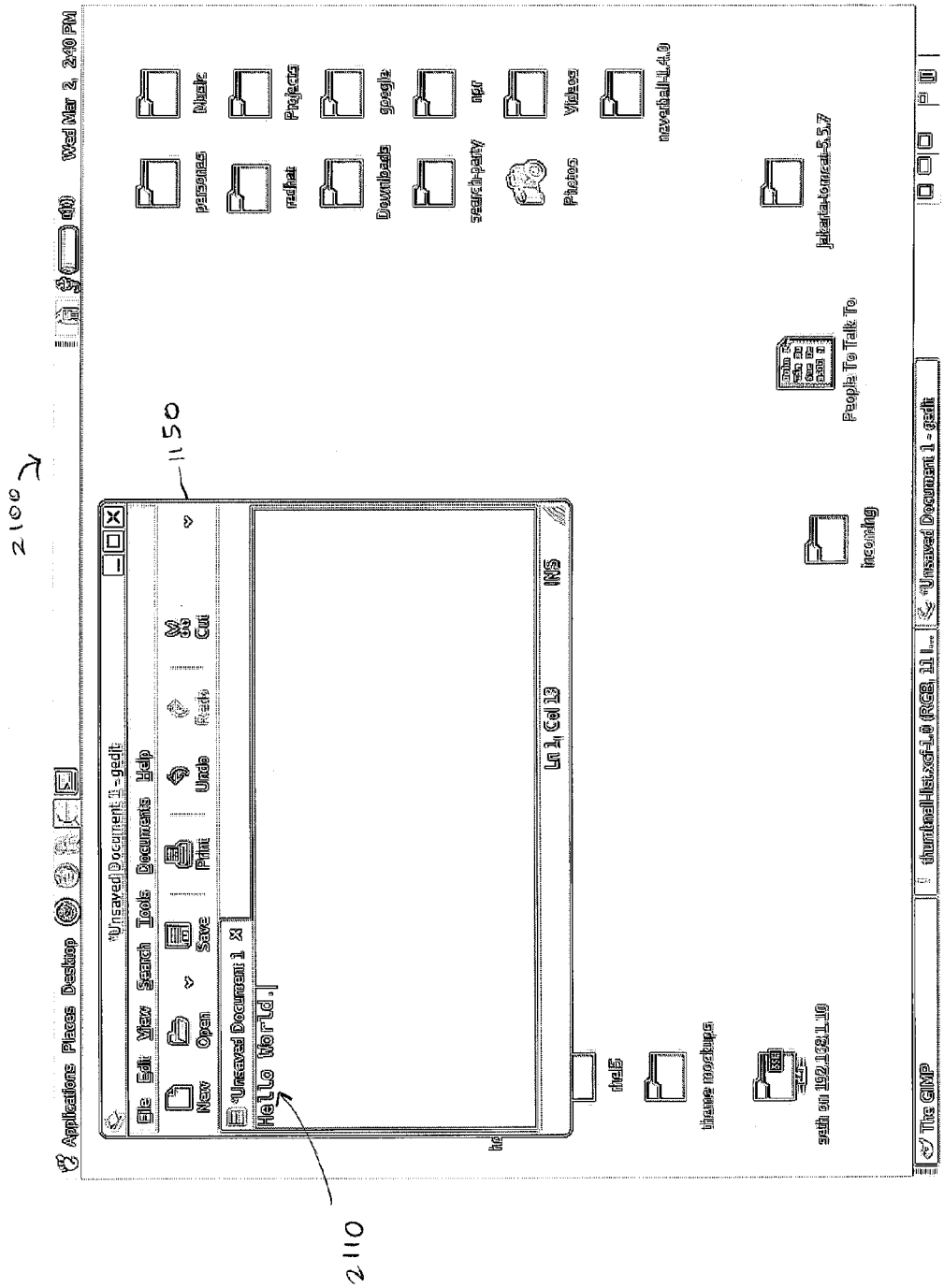
FIG. 21 illustrates the desktop view of the user interface, where the user types in text in the top level window of FIG. 20.

FIG. 21 illustrates the desktop view of the user interface 2100, where the user types in text in the top-level window 1150 of FIG. 20. Specifically, the user types in some text ("Hello World") 2110 into a "text entry" control or widget. A corresponding event may be produced by the text editor application 140, which in turn is transmitted to the event detector 154, and provided from there to the tutorial builder application 110, causing the tutorial builder application 110 to capture the user interface 2100, including the window 1150 in which the text entry control is contained. Moreover, the image editor module 118 edits the captured image by highlighting the text entry control, e.g., highlighting the text, similar to the highlighting of the "Cancel" button 1370 in the window 1350 (FIG. 18) or the "Open" button 1360 in the window 1350 (FIG. 16).

Figure 22:
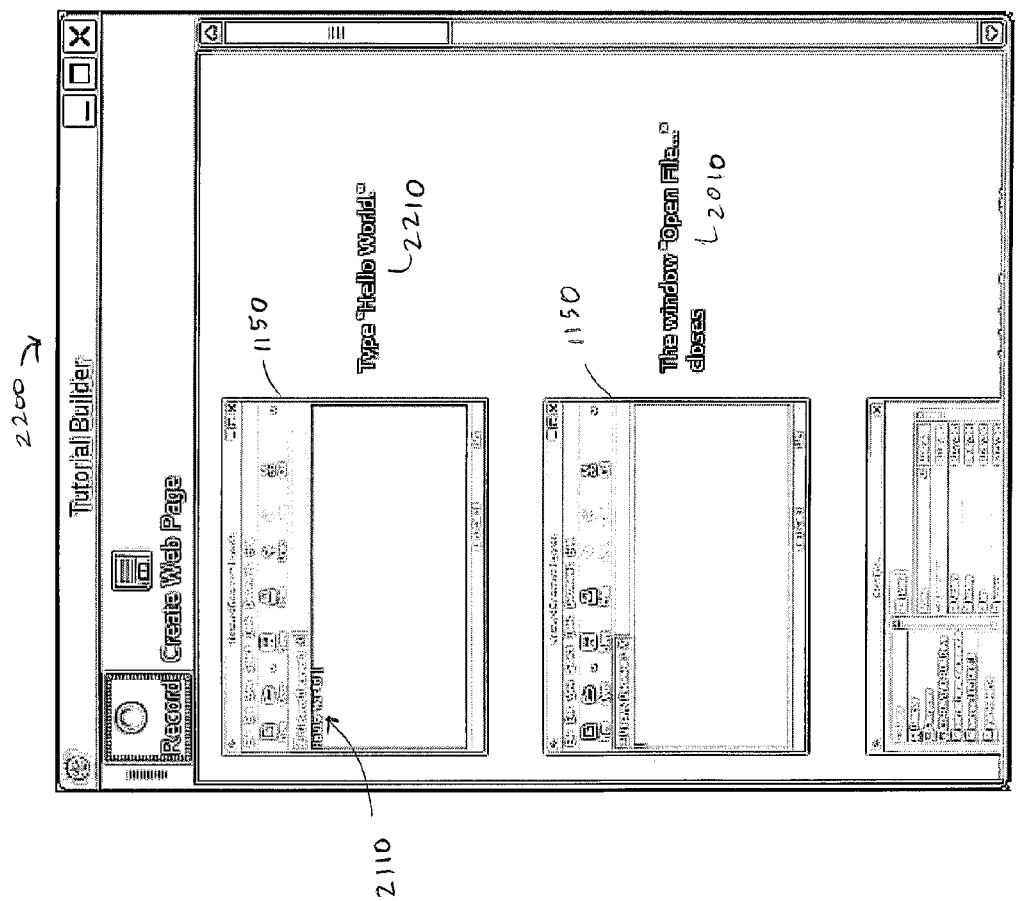
FIG. 22 illustrates the tutorial builder application window, in which a screenshot of the desktop view with the top level window of FIG. 21 is automatically captured, but only the first level window with the typed in text is displayed.

FIG. 22 illustrates the tutorial builder application window 2200, in which a screenshot of the desktop view with the top level window of FIG. 21 is automatically captured, but only the first level window 1150 with the typed in text 2110 is displayed. The automatically generated text 2210 is "Type 'Hello World'". This text is generated by recognizing that a particular type of a control, e.g., a text control, is used to receive typed in text, e.g., "Hello World", from the user.

Figure 23:
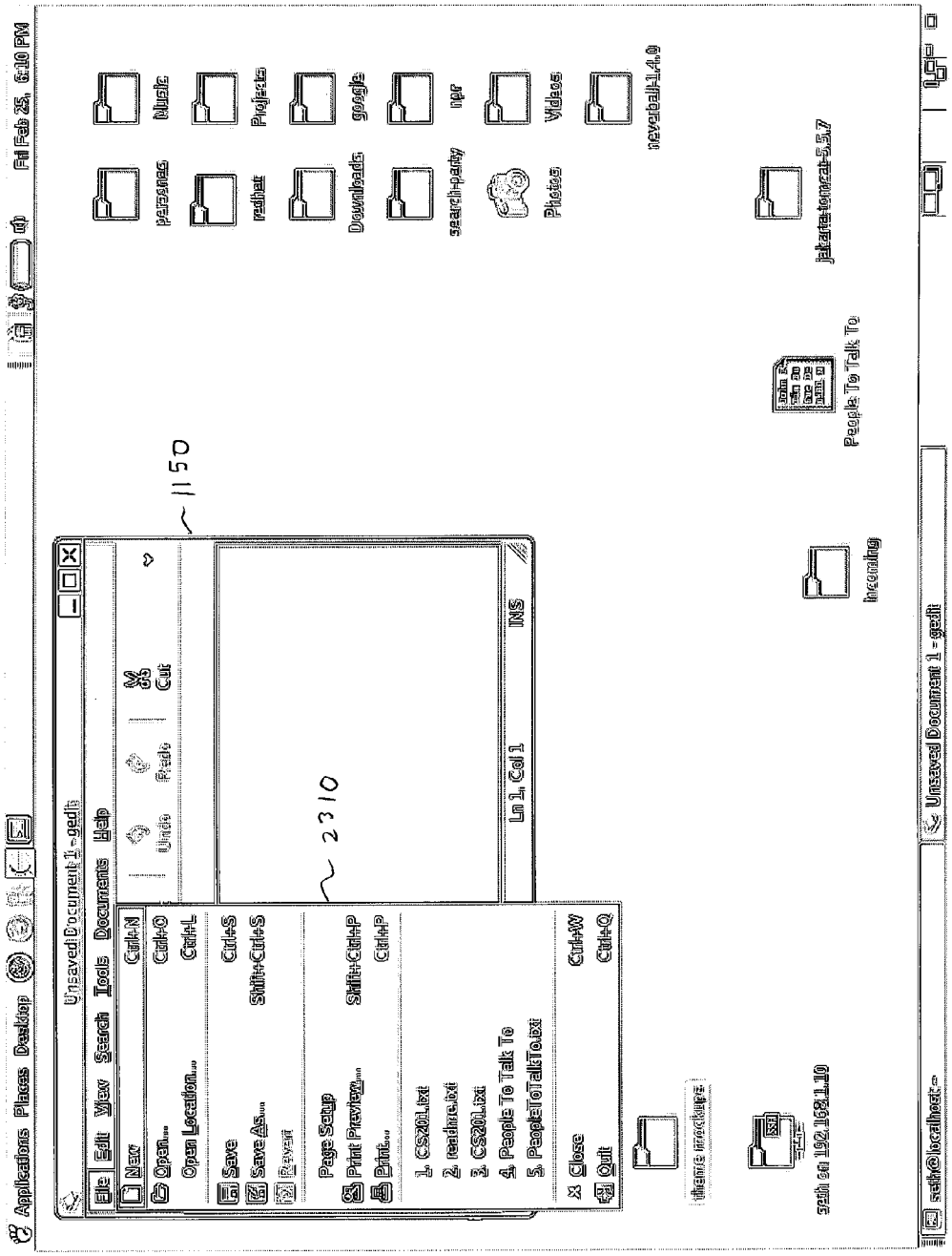
FIG. 23 illustrates the desktop view of the user interface, where the user pulls down a menu from the first level window of FIG. 21.

FIG. 23 illustrates the desktop view of the user interface 2300, where the user pulls down a "File" menu 2310 from the first level window 1150 of FIG. 21. This is analogous to the case in FIG. 8 in which the menu 810 is pulled down. The tutorial builder application may capture the image of the user interface 2300 responsive to the appearance of the menu 2310, but delay editing and writing of the captured image to the tutorial until a final menu item, e.g., a menu item that does not result in a child menu being displayed, has been selected. Or, the capturing of the image of the user interface 2300 may be delayed until the final menu item has been selected.

Figure 24:
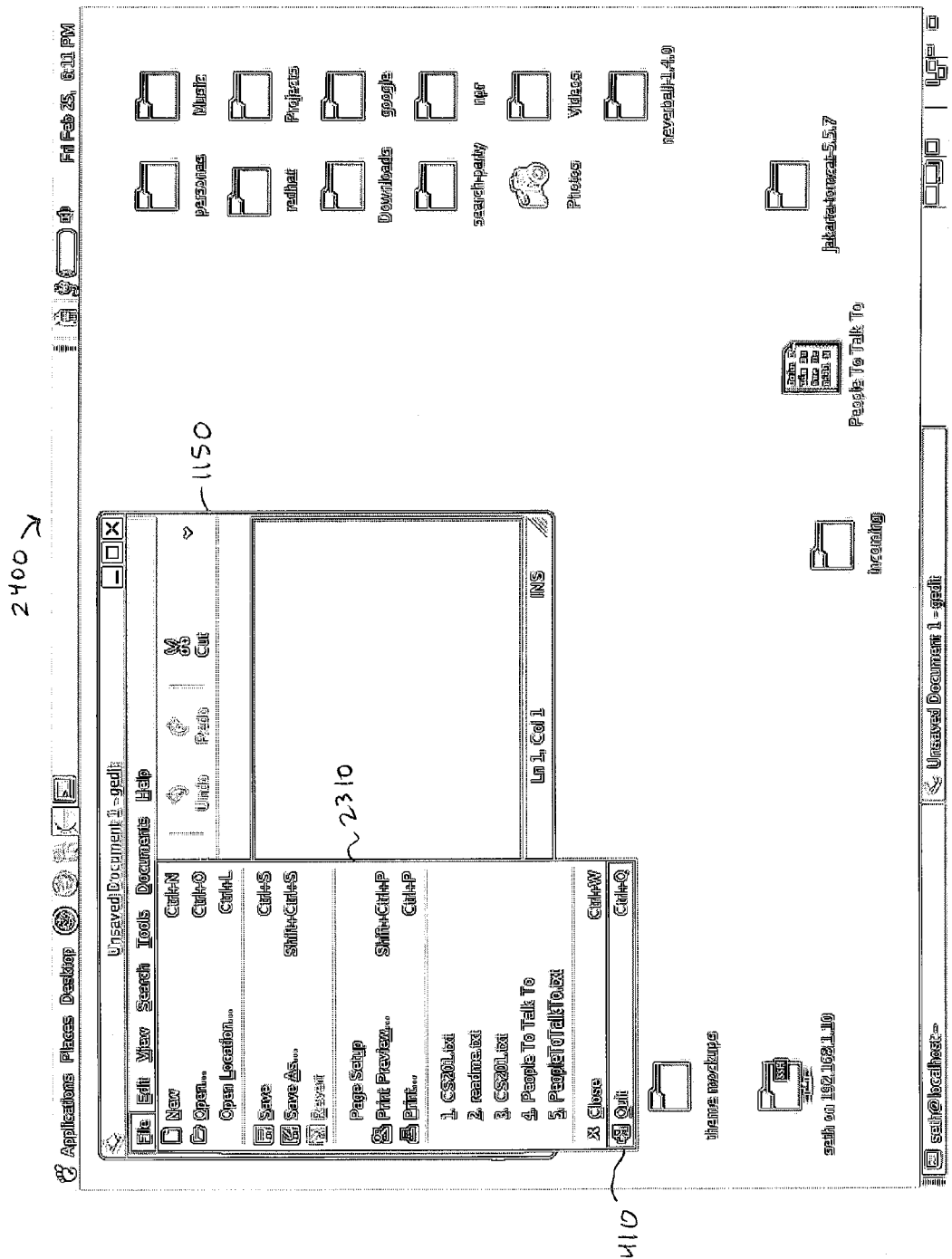
FIG. 24 illustrates the desktop view of the user interface, where the user selects the "quit" menu item from the menu of the first level window of FIG. 23.

FIG. 24 illustrates the desktop view of the user interface, where the user selects the "quit" menu item 2410 from the menu 2310 of the first level window 1150 of FIG. 23. In response, the tutorial builder application captures the image of the user interface 2400, and edits the image by cropping the screenshot to include only the menu 2310, while emphasizing the selected menu item 2410 such as by darkening the rest of the menu.

Figure 25:
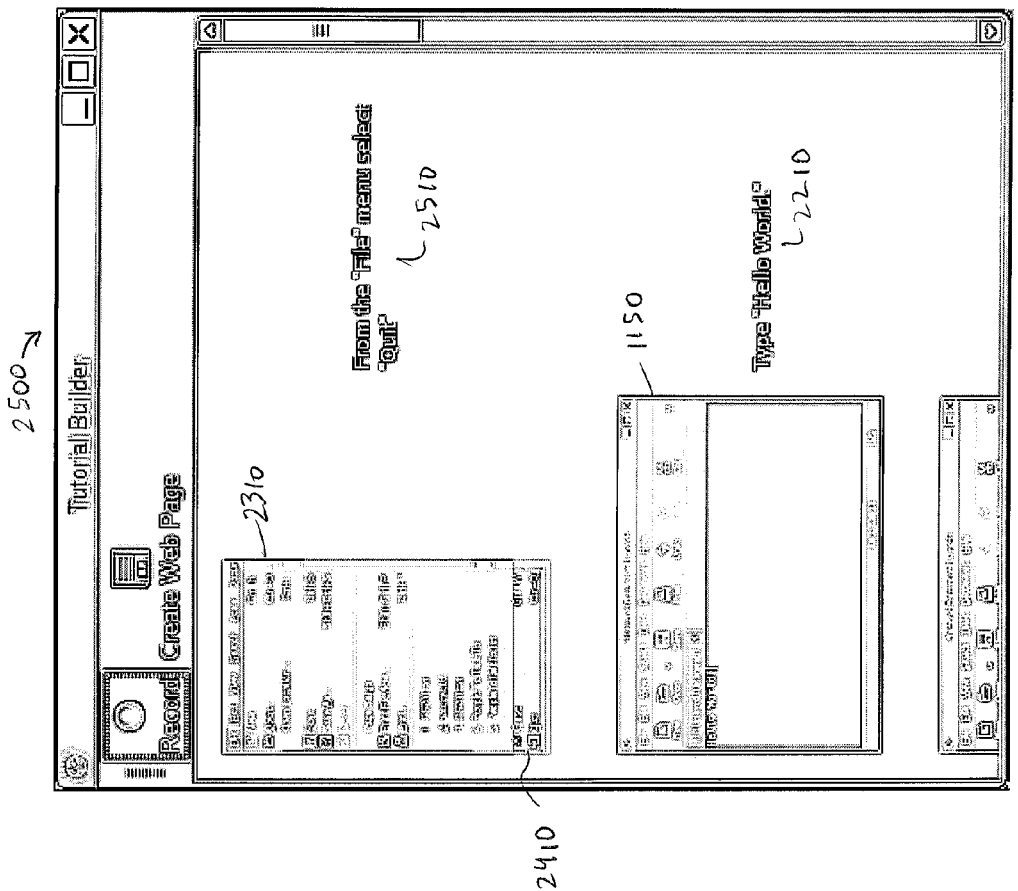
FIG. 25 illustrates the tutorial builder application window, in which a screenshot of the desktop view with the first level window, menu and selected menu item of FIG. 24 is automatically captured, but only the menu and selected menu item are displayed.

FIG. 25 illustrates the tutorial builder application window, in which a screenshot of the desktop view with the first level window, menu and selected menu item of FIG. 24 is automatically captured, but only the menu 2310 and selected menu item 2410 are displayed. The automatically generated text 2510 is "From the 'File' menu select 'Quit'". This text is generated by recognizing that, in a particular type of a control, e.g., a menu, with a particular label, e.g., "File", a user selects a particular menu item having the label "Quit".

Figure 26:
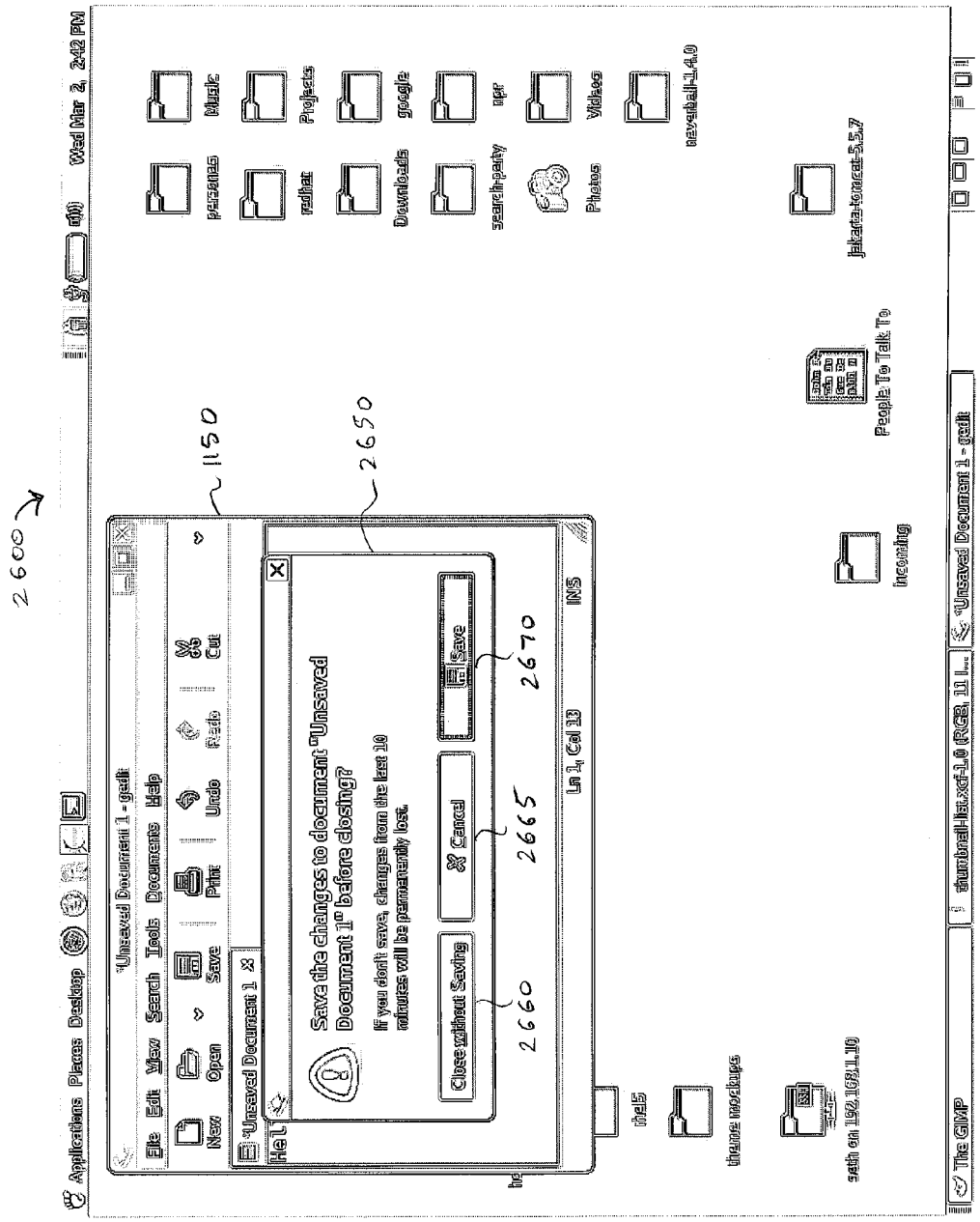
FIG. 26 illustrates the desktop view of the user interface, where an alert window, with a "save" button highlighted, is displayed based on selection of the "quit" menu item in the menu of FIG. 25.

FIG. 26 illustrates the desktop view of the user interface 2600, where an alert window 2650, with a "save" button 2670 highlighted, is displayed based on selection of the "quit" menu item 2410 in the menu 2310 of FIG. 25. When the new child window 2650 with the label "Save Confirmation" pops up, a corresponding event may be generated, for instance. In response, the tutorial builder captures the image of the user interface 2600 in a screenshot and edits the captured image such as by cropping it to include both the parent window 1150 ("Text Editor") and the child window 2650 ("Save Confirmation"), and highlighting the "Save Confirmation" window 2650. Using the accessibility toolkit widget tree, for instance, the tutorial builder determines that this is a special class of window that allows the user to select from among multiple options, e.g., "Close without Saving" at button 2660, "Cancel" at button 2665, or "Save" at button 2670. The special class of window, which may be referred to as an "alert" window, may be used, e.g., to allow the user to confirm a command, or to obtain additional information for carrying out a command, and may be handled differently in the way it is provided in the tutorial and in the way the text is autogenerated, as described below.

Figure 27:
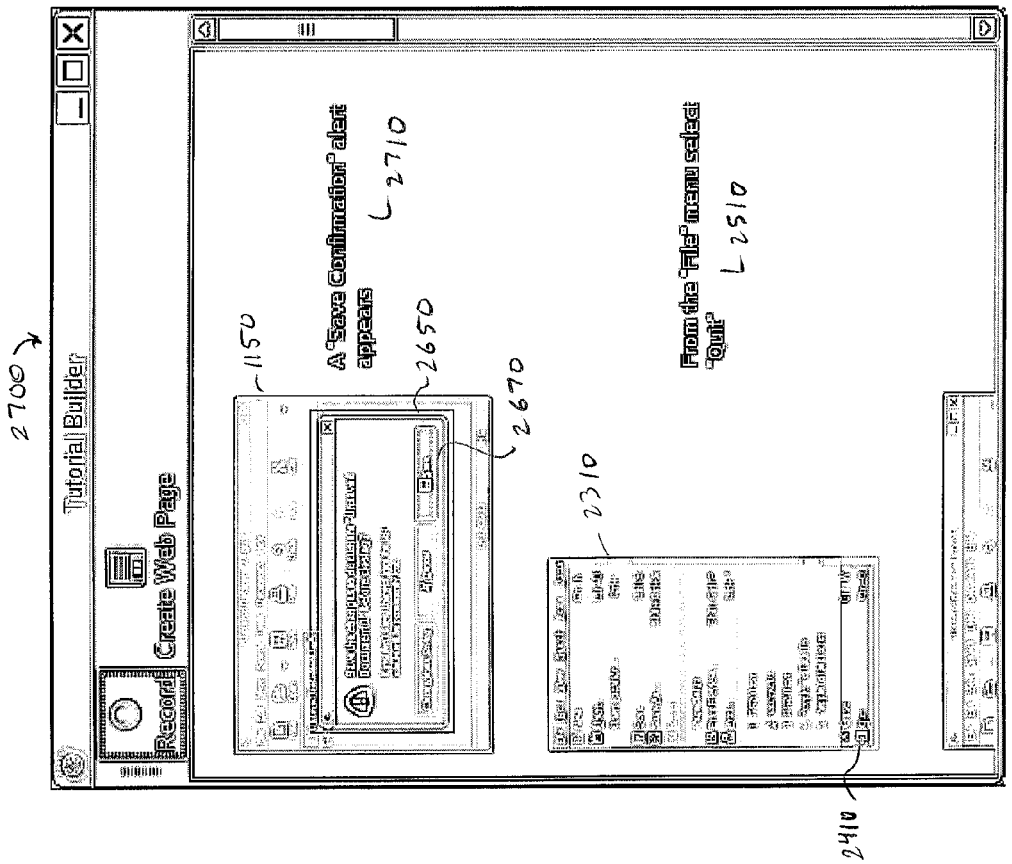
FIG. 27 illustrates the tutorial builder application window, in which a screenshot of the desktop view with the first level window and alert window, with the "save" button selected, of FIG. 26 are automatically captured, but only the first level window and alert window are displayed.

FIG. 27 illustrates the tutorial builder application window 2700, in which a screenshot of the desktop view with the first level window and alert window, with the "save" button highlighted, of FIG. 26 are automatically captured, but only the first level window 1150 and alert window 2650, with the "Save" button 2670 highlighted, are displayed. The automatically generated text 2710 is "A 'Save Confirmation' alert appears". Note the difference in text between this class of window and other "new window" text messages discussed above, such as the text "A new window 'Text Editor' opens" 1230 in FIG. 12. The text 2710 is generated by recognizing that a particular type of a control, e.g., a window, with a particular label, e.g., "Save Confirmation", has opened.

Figure 28:
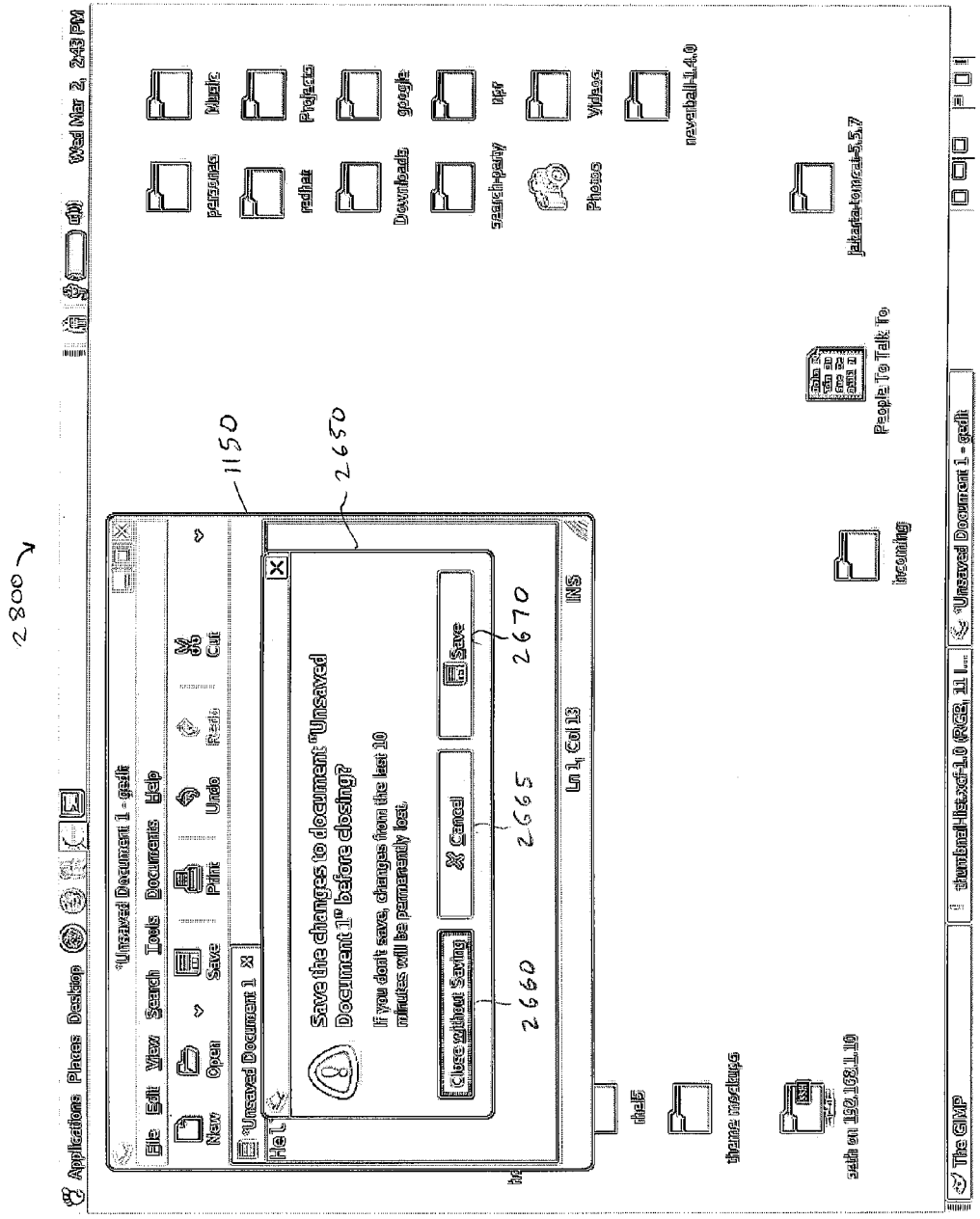
FIG. 28 illustrates the desktop view of the user interface, where the alert window of FIG. 26 with the "Close without Saving" button is selected.

FIG. 28 illustrates the desktop view of the user interface 2800, where the alert window 2650 of FIG. 26 with the "Close without Saving" button 2660 is selected. When the button 2660 is selected by the user, a corresponding event is generated, for instance, enabling the tutorial builder to determine that the window 2650 is of the class "alert", and implementing a special setting for taking screenshots of button presses inside alert windows, discussed below.

Figure 29:
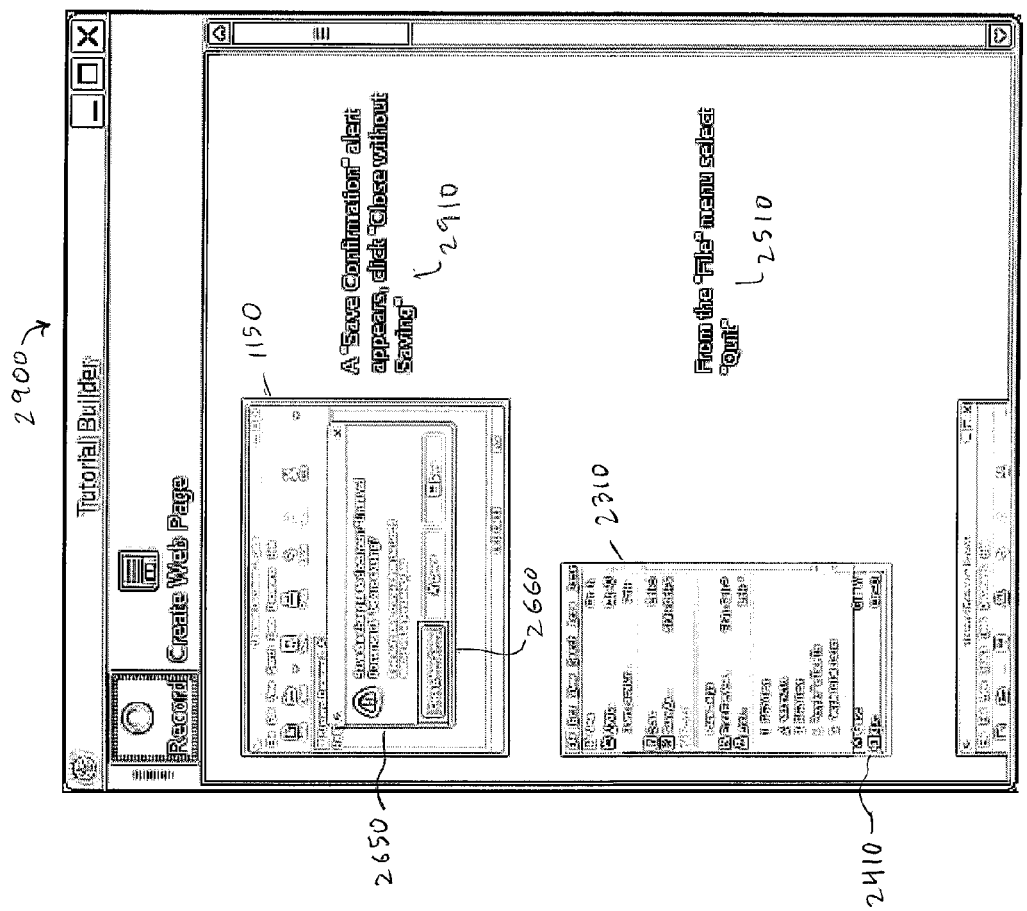
FIG. 29 illustrates the tutorial builder application window, in which a screenshot of the desktop view with the first level window and alert window of FIG. 28 are automatically captured, but only the first level window and alert window, with the "Close without Saving" button highlighted, are displayed, in place of the corresponding display of FIG. 27.

FIG. 29 illustrates the tutorial builder application window 2900, in which a screenshot of the desktop view with the first level window and alert window of FIG. 28 are automatically captured, but only the first level window 1150 and alert window 2650, with the "Close without Saving" button 2660 highlighted, are displayed, in place of the corresponding display of FIG. 27. Specifically, the tutorial builder may replace the previous screenshot in the tutorial since there is no need to have a screenshot of the alert window, with a default button highlighted, e.g., button 2670 (FIG. 26), in addition to a screenshot of the alert window with another button, e.g., button 2660, highlighted (FIG. 28). Thus, only the alert window with the button or other option that is selected by the user is displayed in the tutorial, in place of the window with a default button or option selected.

The automatically generated text 2910 is "A 'Save Confirmation' alert appears, click 'Close without saving'". This text is generated by recognizing that, in a particular type of a control, e.g., an alert window, with a particular label, e.g., "Save Confirmation", a user selects a button having the label "Close without saving".

Figure 30:
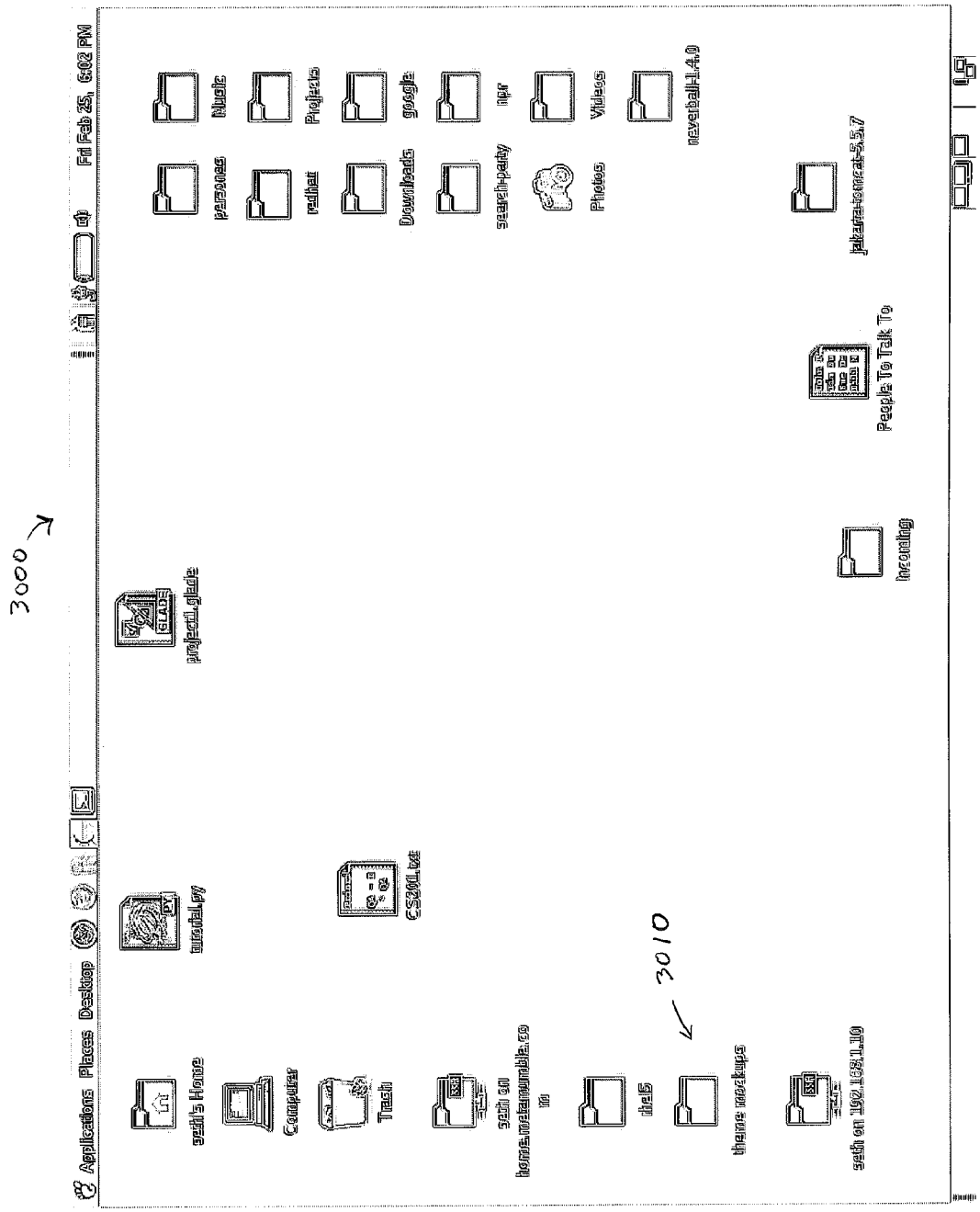
FIG. 30 illustrates the desktop view of the user interface, where the top level window and alert window of FIG. 29 are removed based on selection of the "Close without Saving" button.

FIG. 30 illustrates the desktop view of the user interface 3000, where the top level window 1150 and alert window 2650 of FIG. 29 are removed based on selection of the "Close without Saving" button 2660. The top level/parent window "Text Editor" closes and the tutorial builder takes a screenshot of the entire desktop. The user interface 3000 is the same as the interface 500 of FIG. 5. Note that the user interface 3000 includes a folder 3010 labeled "theme mockups", as discussed below.

Figure 31:
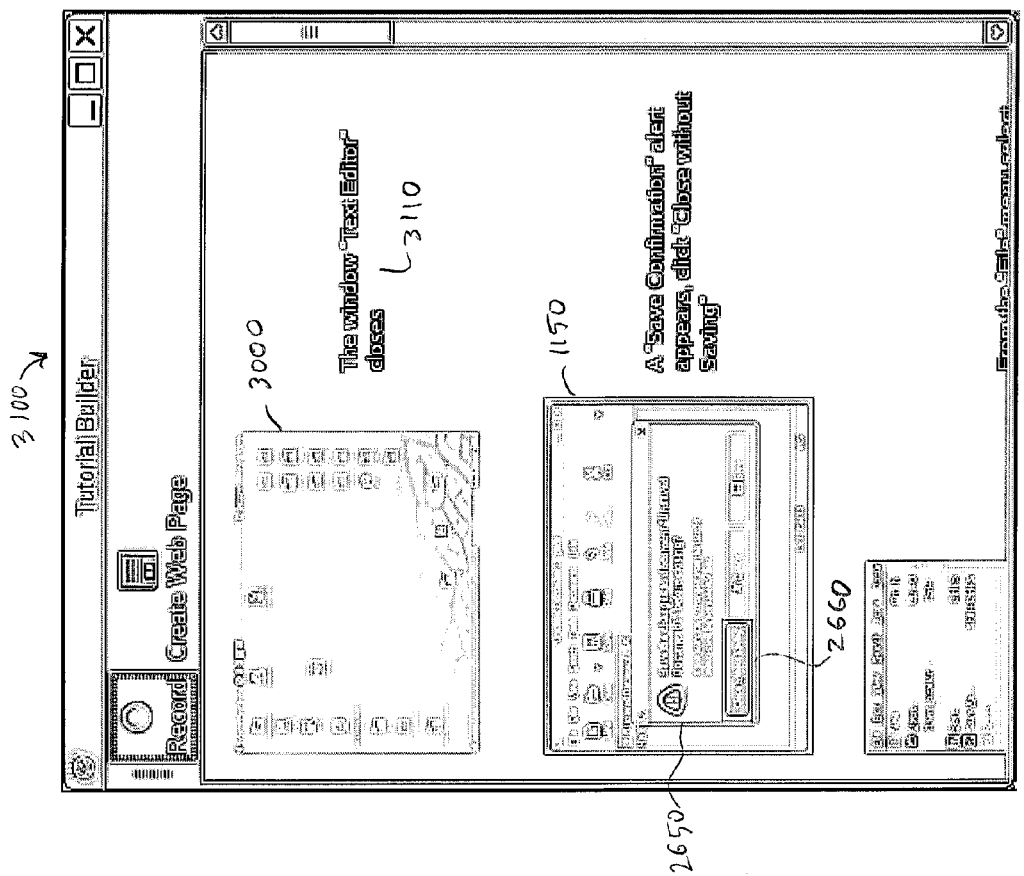
FIG. 31 illustrates the tutorial builder application window, in which a screenshot of the desktop view of FIG. 30 is automatically captured and displayed.

FIG. 31 illustrates the tutorial builder application window 3100, in which a screenshot of the desktop view 300 of FIG. 30 is automatically captured and displayed. The automatically generated text 3110 is "The window 'Text Editor' closes". This text is generated by recognizing that a particular type of a control, e.g., a window, with a particular label, e.g., "Text Editor", has closed.

Figure 32:
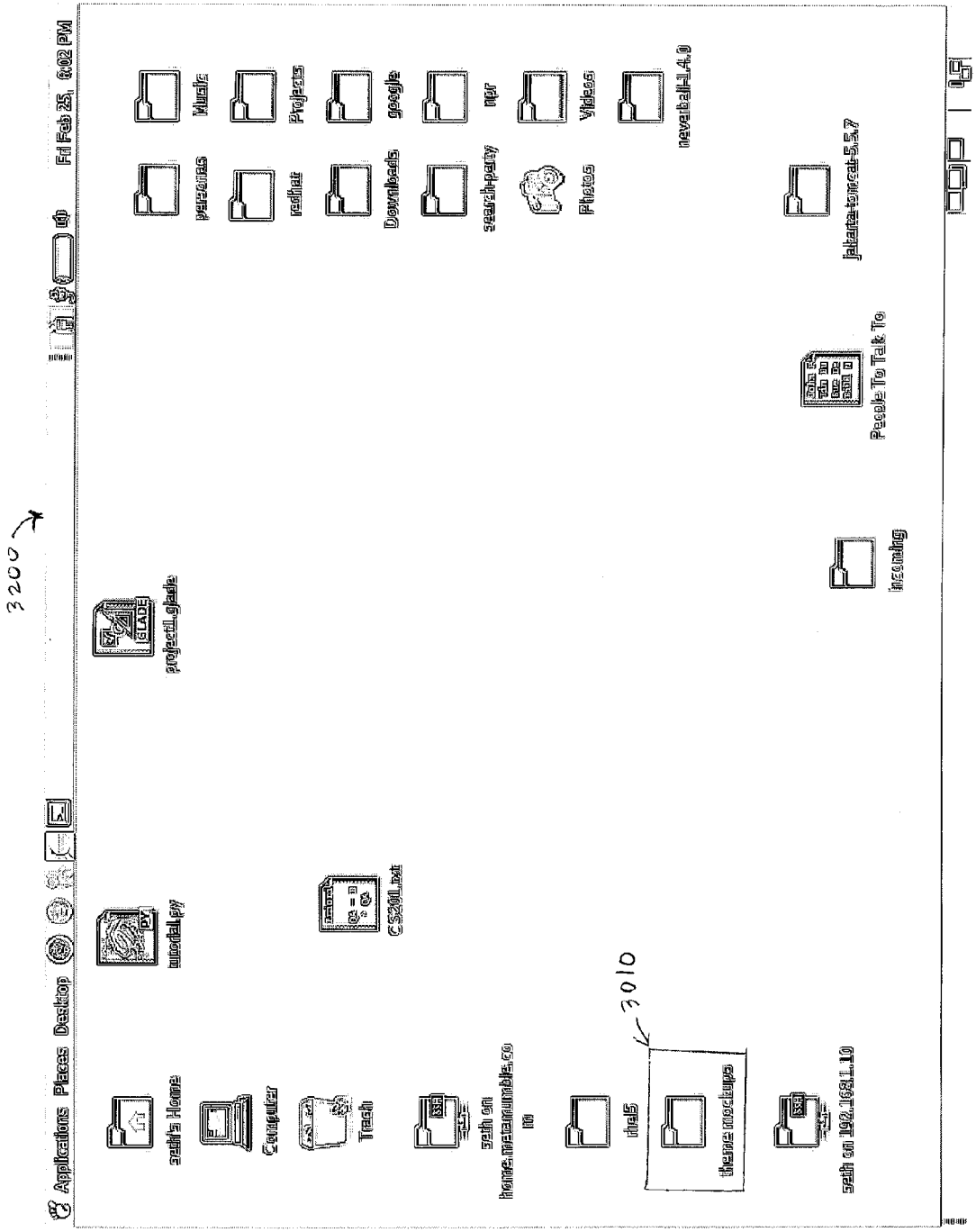
FIG. 32 illustrates the desktop view of the user interface, where the "theme mockups" folder of FIG. 30 is selected by the user.

FIG. 32 illustrates the desktop view of the user interface 3200, where the "theme mockups" folder 3010 of FIG. 30 is selected by the user. Specifically, the user may double click on the folder 3010, resulting in the generating of an event. The tutorial builder determines that the control generating the event, e.g., the folder icon labeled "theme mockups", is on the desktop, and applies editing settings that indicate that, in this situation, cropping of the captured image is not desired. This is true since it is preferable to display the icon 3010 in the tutorial in the context of the entire interface 3200 rather than merely displaying the folder by itself. The editing may also highlight the folder icon 3010 that generated the event by darkening the rest of the screenshot in the tutorial.

Figure 33:
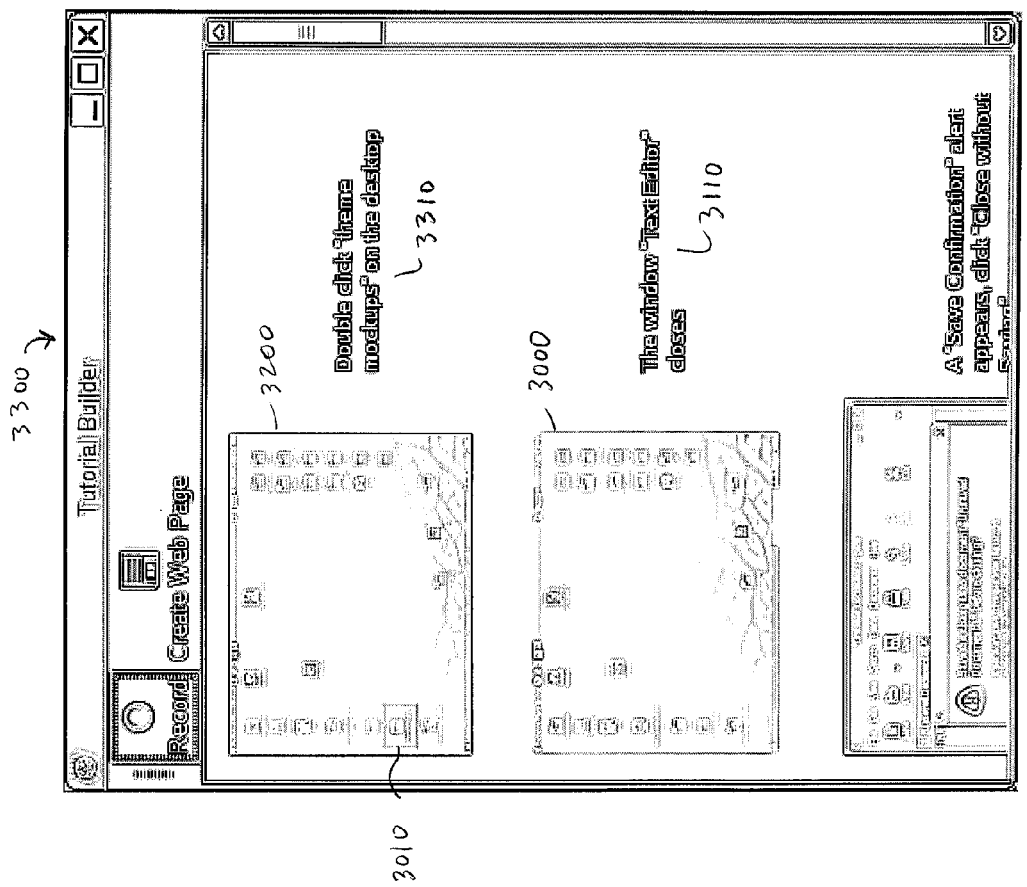
FIG. 33 illustrates the tutorial builder application window, in which a screenshot of the desktop view of FIG. 32 with the "theme mockups" folder selected is automatically captured and displayed.

FIG. 33 illustrates the tutorial builder application window 3300, in which a screenshot of the desktop view 3200 of FIG. 32 with the "theme mockups" folder 3010 selected is automatically captured and displayed. The automatically generated text 3310 is "Double click 'theme mockups' on the desktop". This text is generated by recognizing that a control, e.g., a folder, with a particular label, e.g., "theme mockups", has been selected, e.g., by double clicking on a pointing device.

Figure 34:
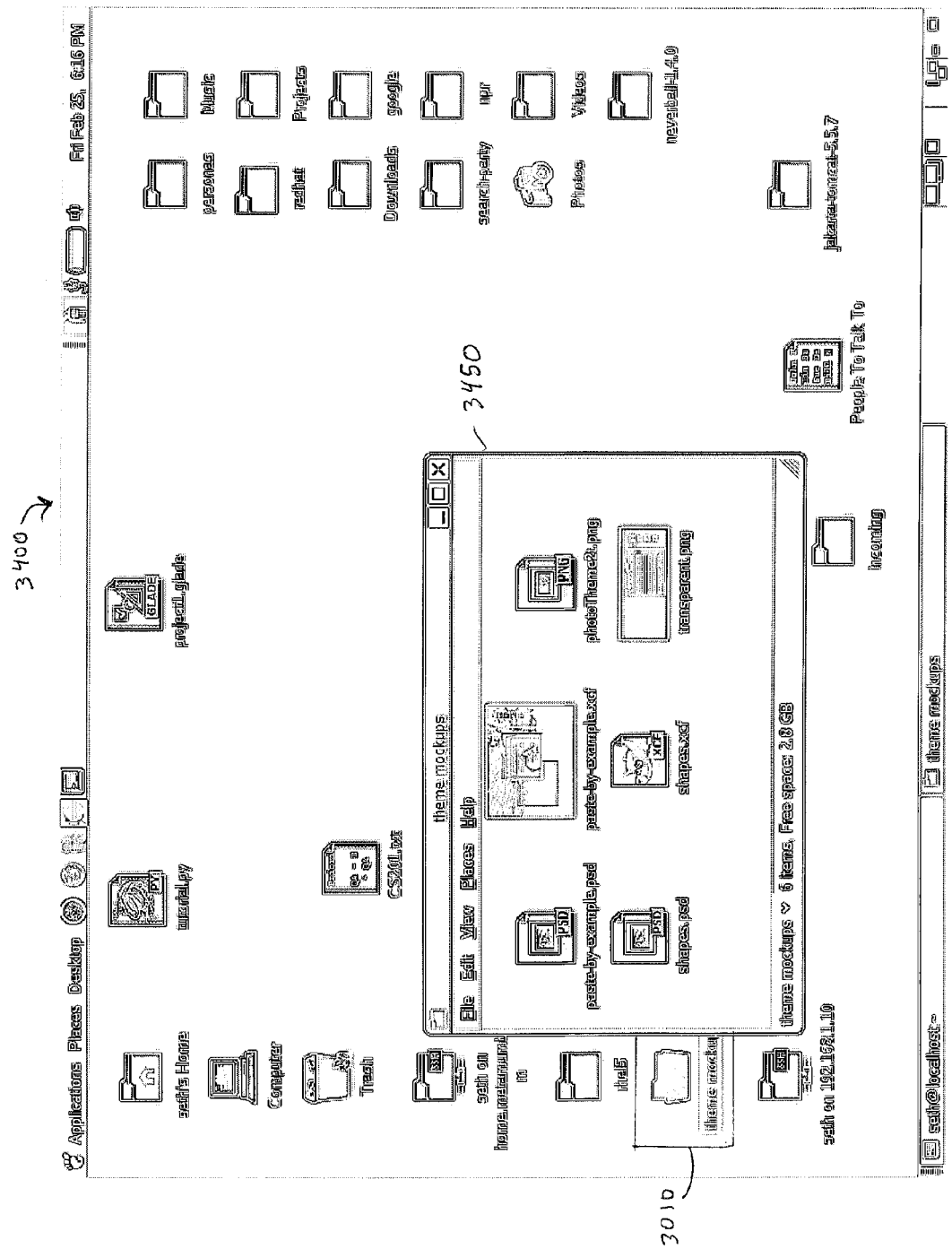
FIG. 34 illustrates the desktop view of the user interface, where a new, top level "theme mockups" window has opened based on selection of the "theme mockups" folder of FIG. 32.

FIG. 34 illustrates the desktop view of the user interface 3400, where a new, top level "theme mockups" window 3450 has opened based on selection of the "theme mockups" folder 3010 of FIG. 32. The appearance of the window 3450 is detected by the pixel monitor 152 or the event detector 154, for instance, thereby causing the tutorial builder to display the entire screenshot in the tutorial with the newly-opened window 3450 emphasized.

Figure 35:
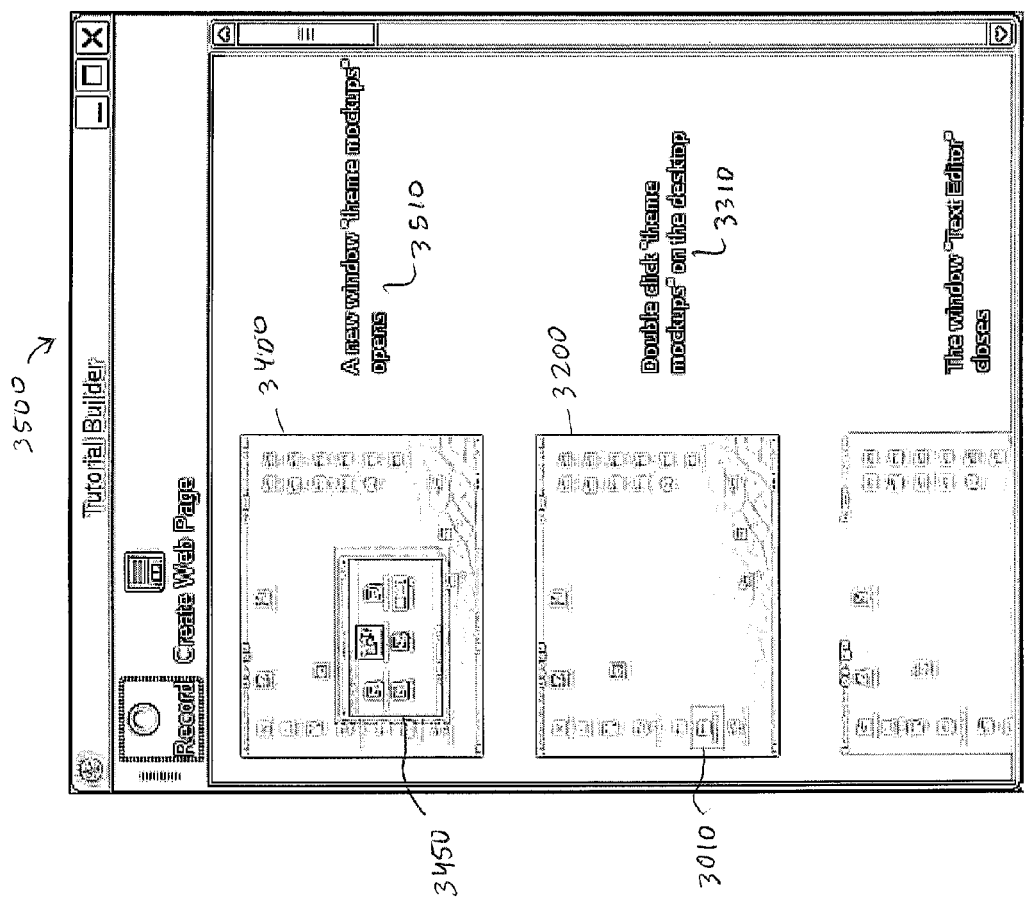
FIG. 35 illustrates the tutorial builder application window, in which a screenshot of the desktop view of FIG. 34 with the "theme mockups" window is automatically captured and displayed.

FIG. 35 illustrates the tutorial builder application window 3500, in which a screenshot of the desktop view of FIG. 34 with the "theme mockups" window 3450 is automatically captured and displayed. Similar to the case in FIG. 12, where the new window 1150 was displayed, the new window 3450 is displayed with the entire interface 3400, with a focus on the new window 3450. The automatically generated text 3510 is "A new window 'theme mockups' opens". This text is generated by recognizing that a control, e.g., a window, with a particular label, e.g., "theme mockups", has been opened.

Accordingly, it can be seen that the present invention provides a technique for automatically capturing screenshots on a computer display to assist in building a tutorial, such as for demonstrating the functionality of one or more applications. The invention can advantageously span multiple applications, e.g., to build a tutorial showing a user entering text in a text editor application, saving the file, and then copying the file using a file manager application.

Moreover, the user can click on any of the autogenerated textual descriptions and edit them to provide their own text that is may better describe what has occurred in the displayed images. For example, instead of the text "A new window 'Text Editor' opens" (FIG. 12), the user might type the text "The window for your text editor opens, allowing you to type any text notes you want in this window".

Furthermore, any of the images provided in the tutorial can be deleted, e.g., by right clicking on them to bring up a menu including a "delete" option, or by providing a "delete" button next to each image in the tutorial. This allows the user who is building the tutorial to remove images that are not believed to be necessary or helpful.

The tutorial builder application may further be configured such that pressing the "print screen" key on the keyboard causes the tutorial builder to take a screenshot, in case an important event is not automatically detected. No text will be generated though, if no event is available.

Additionally, if the user does not like the particular editing, such as cropping or highlighting, applied to an image in the tutorial, the user can access an editing menu such as the menu 400 of FIG. 4, e.g., by right clicking on the image. As mentioned, the tutorial builder can record the entirety of each image on the user interface to enable the user to access the entire user interface, e.g., even if cropping is initially applied. Furthermore, the user can choose a particular "zoom level" later when the user reviews the results; that is, the editing can be changed retroactively. For example, at the end of recording a tutorial, assume the user looks back at the tutorial window 1000 of FIG. 10, and desires to have the entire desktop displayed instead of just the menus 920. This can be achieved by, e.g., right clicking on the image of the menus 920, thereby bringing up a menu that provides a variety of possible cropping options, such as "Whole Desktop", "Menu with Parent Window", and "Menu Only" (the automatically chosen cropping). The menu may further provide thumbnail images of the desktop with the different options applied. Or, an "edit" button can be provided next to each image in the tutorial.

In addition to allowing the specification of manual cropping parameters and other editing settings, the user can also select between alternative automatically generated edits of the captured image. For example, a drop down menu could show several alternative automatically generated edited versions, allowing the user to select a different version to use. The drop down menu could allow selection between: a shot cropped to the button generating the event, a shot cropped to the button's parent window with the button emphasized, a shot of the whole screen with the button emphasized, a shot of the whole screen, and so forth.

Moreover, while an accessibility toolkit, such as GTK+/Linux, was mentioned for use in observing events generated by any application on the system (e.g., button clicks, new windows, drag and drop events, check boxes, menus, and so forth), there are other ways of implementing the invention, as mentioned, such as by preparing a program that monitors the screen output, e.g., pixel values, and cropping to any screen areas that change so that the changed areas are displayed in the tutorial. Thus, any technique for detecting when the appearance of the user interface changes and automatically taking screenshots of the user interface to build a tutorial may be used.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

What is claimed is:

1. A method of building a tutorial comprising:
monitoring, by a processor, an application while a user is utilizing an input device to interact with the application to build the tutorial;
determining, by the processor, during the monitoring that the application displays a window that allows the user to select from a plurality of options;
automatically capturing, by the processor, during the monitoring, an image that is generated by the monitored application in response to detecting selection by the user of an option from the plurality of options in the window of the monitored application by receiving input from the input device directed to the monitored application, wherein capturing comprises storing an image file to a designated location, the image file comprising the image generated by the application displaying the window with the option visually identified;
editing, by the processor and without editing directions from the user, the image in view of editing settings to provide an edited image, wherein editing the image comprises identifying a portion of the image that was captured that is to be displayed with a focus in the tutorial, and at least one of cropping out a remaining portion of the image that was captured or de-emphasizing the remaining portion of the image that was captured;
automatically generating, by the processor, human-readable text that describes the edited image that was automatically captured, wherein the human-readable text is not part of the image that was automatically captured; and
building, by the processor, the tutorial using the user interaction, the human-readable text, and at least a portion of the edited image.

2. The method of claim 1, further comprising:
displaying the tutorial while displaying the image.

3. The method of claim 1, wherein the user utilizes the input device to interact with a plurality of applications, the method further comprising:
displaying images that are generated by the plurality of applications;
automatically capturing the images displayed; and
building the tutorial using at least a portion of the captured images.

4. The method of claim 1, further comprising:
displaying a control that allows the user to direct that the tutorial be outputted as a preformatted web page according to a format that is selected by the user from among a plurality of available formats.

5. The method of claim 1, further comprising:
enabling the user to select the editing settings.

6. The method of claim 1, further comprising:
displaying a control that allows the user to remove an undesired captured image from the tutorial.

7. The method of claim 1, further comprising:
displaying a control that allows the user to manually select one of a plurality of alternative automatically edited versions of the captured image for use in the tutorial.

8. The method of claim 1, further comprising:
displaying a control that allows the user to input text to be associated with the at least a portion of the captured image in the tutorial.

9. The method of claim 1, further comprising:
displaying a control that allows the user to edit the generated human-readable text.

10. A program storage device comprising instructions to cause a processor to perform the operations of claim 1.

11. A method of building a tutorial comprising:
monitoring, by a processor, an application while a user is utilizing an input device to interact with the application to build the tutorial;
detecting, by the processor, during the monitoring, a change in images that are generated by the monitored application in response to the user interaction with the monitored application by receiving input from the input device directed to the monitored application;
capturing, by the processor, one of the images responsive to the detecting of the change, wherein capturing comprises storing an image file to a designated location, the image file comprising the one of the images generated by the application;
editing, by the processor, without editing directions from the user, the one of the images that was captured, to provide an edited image, wherein editing comprises identifying a changed portion of the one of the images that was captured that is to be displayed with a focus in the tutorial, and at least one of cropping out a remaining portion of the one of the images that was captured or de-emphasizing the remaining portion of the one of the images that was captured;
storing a second image file to the designated location, the second image file comprising the edited image; and
building, by the processor, the tutorial using the user interaction and the second image file.

12. The method of claim 11, wherein the change is dependent on the user interaction with the at least one application.

13. The method of claim 11, wherein the change is detected by monitoring pixel values in the images.

14. A program storage device comprising instructions to cause a processor to perform the operations of claim 11.

15. A method of building a tutorial comprising:
monitoring, by a processor, an application while a user is utilizing an input device to interact with the application to build the tutorial;
detecting, by the processor, during the monitoring, an event that is generated by the monitored application in response to the user interaction with the monitored application by receiving input from the input device directed to the monitored application;
capturing, by the processor, responsive to the detecting of the event, an image that is generated by the monitored application, wherein capturing comprises storing an image file to a designated location, the image file comprising the image generated by the monitored application;
editing, by the processor, without editing directions from the user, the image that was captured to provide an edited image, wherein editing comprises identifying a portion of the captured image associated with the event that is to be displayed with a focus in the tutorial, and at least one of cropping out a remaining portion of the captured image or de-emphasizing the remaining portion of the captured image;
storing a second image file to the designated location, the second image file comprising the edited image; and
building, by the processor, the tutorial using the user interaction and the second image file.

16. The method of claim 15, wherein the event comprises at least one of: (a) a window opening and a window closing, (b) the user selecting on a control, (c) the user selecting an item in a menu, (d) the user entering text into a control, (e) at least one of a window being moved, a window being resized, a window being maximized or a window being minimized, or (f) at least one of a control or an icon being dragged from one point to another.

17. The method of claim 15, wherein the event is detected by an accessibility toolkit.

18. The method of claim 15, further comprising:
automatically generating human-readable text, by the processor, responsive to the detecting of the event, wherein the human-readable text describes the captured image for use in the tutorial, and wherein the human-readable text is not part of the at least one captured image.

19. The method of claim 15, further comprising:
automatically generating human-readable text describing the event to accompany the edited image in the tutorial.

20. A program storage device comprising instructions to cause a processor to perform the operations of claim 15.

21. A method of building a tutorial comprising:
monitoring, by a processor, an application while a user is utilizing an input device to interact with the application, for use in building the tutorial;
automatically capturing, by the processor, during the monitoring, an image that is generated by the monitored application in response to the user interaction with the monitored application by receiving input from the input device directed to the monitored application, wherein capturing comprises storing an image file to a designated location, the image file comprising the image generated by the at least one application;
automatically editing, by the processor, without editing directions from the user, the captured image to provide an edited image by identifying a portion of the captured image that is to be displayed with a focus in the tutorial, and at least one of cropping out a remaining portion of the captured image or de-emphasizing the remaining portion of the captured image;
storing a second image file to the designated location, the second image file comprising the edited image; and
building, by the processor, the tutorial using the user interaction and at least a portion of the second image file.

22. The method of claim 21, wherein the providing a focus on a portion of the captured image comprises determining a changed portion of the captured image, and displaying the changed portion with a focus in the tutorial.

23. The method of claim 21, wherein the automatically editing comprises:
detecting a control with which the user interacted in the captured image; and
determining a window containing the control in the captured image; and
cropping to emphasize the window containing the control in the captured image when building the tutorial.

24. The method of claim 21, wherein the automatically editing comprises:
providing a focus on a portion of the captured image from which an event originated.

25. The method of claim 21, wherein the de-emphasizing comprises at least one of: (a) darkening the remaining portion, (b) desaturating at least one color of the remaining portion, (c) blurring the remaining portion, or (d) overlaying a partially transparent shape over the remaining portion.

26. The method of claim 21, wherein the automatically editing comprises determining a portion of the captured image that is to be displayed with a focus in the tutorial.

27. The method of claim 26, wherein the portion of the captured image that is to be displayed with a focus in the tutorial comprises at least one of a new window or a new menu.

28. The method of claim 26, wherein the portion of the captured image that is to be displayed with a focus in the tutorial comprises at least one of: (a) a parent menu, when a child menu is closed, or (b) a parent window, when a child window is closed.

29. The method of claim 21, further comprising:
    displaying a control that allows the user to manually edit the edited image.

30. A program storage device comprising instructions to cause a processor to perform the operations of claim 21.

* * * * *